(12) United States Patent
Hong et al.

(10) Patent No.: US 11,114,762 B2
(45) Date of Patent: Sep. 7, 2021

(54) METHOD OF OUTPUTTING A SIGNAL USING AN ANTENNA DISPOSED ADJACENT TO A CONDUCTIVE MEMBER OF A CONNECTOR AND AN ELECTRONIC DEVICE USING THE SAME

(71) Applicant: Samsung Electronics Co., Ltd., Gyeonggi-do (KR)

(72) Inventors: Sang-Ho Hong, Gyeonggi-do (KR); Gun Park, Gyeonggi-do (KR); Yong-Woog Shin, Gyeonggi-do (KR); Sung-Chul Park, Seoul (KR)

(73) Assignee: Samsung Electronics Co., Ltd

( * ) Notice: Subject to any disclaimer, the term of this patent is extended or adjusted under 35 U.S.C. 154(b) by 563 days.

(21) Appl. No.: 15/967,070

(22) Filed: Apr. 30, 2018

(65) Prior Publication Data

US 2018/0316094 A1     Nov. 1, 2018

(30) Foreign Application Priority Data

Apr. 28, 2017  (KR) .................. 10-2017-0055282

(51) Int. Cl.
*H01Q 1/24*     (2006.01)
*H01Q 5/335*    (2015.01)
(Continued)

(52) U.S. Cl.
CPC ............ *H01Q 5/335* (2015.01); *H01Q 1/242* (2013.01); *H01Q 1/48* (2013.01); *H01Q 15/14* (2013.01)

(58) Field of Classification Search
CPC .......... H01Q 5/335; H01Q 15/14; H01Q 1/48; H01Q 1/242; H01Q 5/328; H01Q 1/44; H01Q 1/243; H01Q 5/378; H04B 17/103
See application file for complete search history.

(56) References Cited

U.S. PATENT DOCUMENTS 8,155,607 B2 * 4/2012 Kim .................. H01Q 9/0421
                                                 455/129
9,184,494 B1  11/2015 Liu et al.
(Continued)

FOREIGN PATENT DOCUMENTS

CN      203367465       12/2013
CN      103516842        1/2014
(Continued)

OTHER PUBLICATIONS

European Search Report dated Mar. 11, 2020 issued in counterpart application No. 18791244.9-1205, 8 pages.
(Continued)

*Primary Examiner* — Dimary S Lopez Cruz
*Assistant Examiner* — Bamidele A Jegede
(74) *Attorney, Agent, or Firm* — The Farrell Law Firm, P.C.

(57) ABSTRACT

An electronic device is provided and includes a first housing forming a portion of an outside surface of the electronic device, a second housing coupled with the first housing and forming another portion of the outside surface of the electronic device, an antenna formed in at least a portion of the second housing, a connector including one or more connection pins for connection with an external device, at least a portion of an outside surface of the connector being formed of a conductive member, an adjusting circuit electrically connected with, at least, the portion of the outside surface of the connector formed of the conductive member, wherein an impedance of the adjusting circuit is variable. The electronic device may further include a processor configured to vary the impedance of the adjusting circuit based on a signal to be output through the antenna, and output the signal through the antenna, with the impedance of the adjusting circuit being varied.

20 Claims, 13 Drawing Sheets

(51) Int. Cl.
*H01Q 1/48* (2006.01)
*H01Q 15/14* (2006.01)

(56) References Cited

U.S. PATENT DOCUMENTS

| | | | |
|---|---|---|---|
| 9,373,883 B2* | 6/2016 | Hwang | H01Q 1/48 |
| 9,544,405 B1* | 1/2017 | Kodama | H01Q 21/28 |
| 2011/0050532 A1* | 3/2011 | Liu | H01Q 5/342 |
| | | | 343/846 |
| 2011/0102290 A1* | 5/2011 | Milosavljevic | H01Q 13/10 |
| | | | 343/852 |
| 2012/0299785 A1* | 11/2012 | Bevelacqua | H01Q 5/328 |
| | | | 343/702 |
| 2014/0128007 A1* | 5/2014 | Chen | H04B 1/18 |
| | | | 455/77 |
| 2014/0210675 A1 | 7/2014 | Hwang et al. | |
| 2014/0273832 A1* | 9/2014 | Kim | H02J 50/20 |
| | | | 455/41.1 |
| 2015/0022422 A1* | 1/2015 | Chang | H01Q 1/243 |
| | | | 343/861 |
| 2015/0054701 A1* | 2/2015 | Kim | H01Q 5/364 |
| | | | 343/750 |
| 2015/0155614 A1 | 6/2015 | Youn et al. | |
| 2015/0270608 A1 | 9/2015 | Sub Shin | |
| 2015/0333399 A1* | 11/2015 | Huang | H01Q 1/243 |
| | | | 343/749 |
| 2016/0056535 A1 | 2/2016 | Sakong et al. | |
| 2016/0097833 A1 | 4/2016 | Han et al. | |
| 2016/0142083 A1* | 5/2016 | Kim | H01Q 9/145 |
| | | | 455/300 |
| 2016/0254590 A1* | 9/2016 | Seo | H01Q 1/243 |
| | | | 343/876 |
| 2017/0012599 A1 | 1/2017 | Iwanaga | |
| 2017/0033440 A1* | 2/2017 | Kim | H01Q 1/48 |
| 2017/0047640 A1* | 2/2017 | Choi | H01Q 1/243 |
| 2017/0170562 A1* | 6/2017 | Lee | H01Q 9/14 |
| 2017/0290184 A1* | 10/2017 | Kim | H04M 1/0277 |

FOREIGN PATENT DOCUMENTS

| | | |
|---|---|---|
| CN | 103972637 | 8/2014 |
| CN | 105099491 | 11/2015 |
| KR | 1020110074227 | 6/2011 |
| KR | 1020150027682 | 3/2015 |
| KR | 10-2016-0057142 | 5/2016 |

OTHER PUBLICATIONS

International Search Report dated Jul. 30, 2018 issued in counterpart application No. PCT/KR2018/004939, 9 pages.
Korean Office Action dated Jan. 8, 2021 issued in counterpart application No. 10-2017-0055282, 11 pages.
Chinese Office Action dated Aug. 3, 2020 issued in counterpart application No. 201880025899.9, 24 pages.

* cited by examiner

METHOD OF OUTPUTTING A SIGNAL USING AN ANTENNA DISPOSED ADJACENT TO A CONDUCTIVE MEMBER OF A CONNECTOR AND AN ELECTRONIC DEVICE USING THE SAME

CROSS-REFERENCE TO RELATED APPLICATION(S)

This application is based on and claims priority under 35 U.S.C. § 119 to Korean Patent Application No. 10-2017-0055282, filed on Apr. 28, 2017, in the Korean Intellectual Property Office, the disclosure of which is incorporated herein by reference in its entirety.

BACKGROUND

1. Field

The present disclosure relates to electronic devices including conductive members and antennas for transmitting and receiving wireless signals.

2. Description of the Related Art

Electronic devices, such as smartphones, tablet PCs, laptop computers, and wearable devices, have become widely used and configured to perform various functions. For example, voice communications, Internet searches, taking photos and recording videos, playing music, and watching videos may each be carried out on electronic devices.

Electronic devices may perform wireless communication via their equipped antennas. For example, electronic devices may come with different types of antenna devices, such as antennas for near-field communication (NFC) for wireless charging or electronic card features, antennas for accessing a local area network (LAN), and antennas for accessing commercial communication networks. As such, an electronic device may be equipped with various types of antenna devices, ensuring an optimal communication environment by choosing an adequate one of the antenna devices depending on its use environment or operation mode.

Placing multiple antennas having different shapes in one electronic device may pose a difficulty in securing space for installing the antennas. The recent trend of making electronic devices more and more compact makes it difficult to sufficiently space apart the antennas from each other, or to allow for space between the antennas and conductive members (e.g., shells for receiving connectors) in the electronic device.

Such issues still remain although the antennas are placed in a metal case or housing of the electronic device.

This may lower the radiation performance of antennas caused by a connection to an external device via the conductive members (e.g., shells for receiving connectors) in the electronic device or the connectors contained in the conductive members.

SUMMARY

Embodiments of the present disclosure are to address at least the above-mentioned problems and/or disadvantages and to provide at least the advantages described below.

In accordance with an aspect of the present disclosure, an electronic device may prevent a reduction in radiation performance of an antenna according to a connection with an external device through a connector or according to a conductive member included in the electronic device.

According to an embodiment, an electronic device includes a first housing forming a portion of an outside surface of the electronic device, a second housing coupled with the first housing and forming another portion of the outside surface of the electronic device, an antenna formed in at least a portion of the second housing, a connector including one or more connection pins for connection with an external device, at least a portion of an outside surface of the connector being formed of a conductive member, an adjusting circuit electrically connected with, at least, the portion of the outside surface of the connector formed of the conductive member wherein an impedance of the adjusting circuit is variable, and a processor configured to vary the impedance of the adjusting circuit based on a signal to be output through the antenna and output the signal through the antenna, with the impedance of the adjusting circuit being varied.

In accordance with another embodiment, an electronic device includes an antenna, a communication circuit connected with the antenna and configured to output signals of a first frequency band and a second frequency band through the antenna, a conductive member disposed adjacent the antenna, a connector received in the conductive member and including one or more connection pins for connection with an external device, a first filter circuit connected with the conductive member and configured to transmit the signals of the first frequency band and the second frequency band, a first matching circuit corresponding to the first frequency band, a second matching circuit corresponding to the second frequency band, and a switching circuit configured to connect the first filter circuit with at least one of the first matching circuit or the second matching circuit.

In accordance with another embodiment, an electronic device includes a first housing forming a portion of an outside surface of the electronic device, a second housing coupled with the first housing and forming another portion of the outside surface of the electronic device, an antenna formed in at least a portion of the second housing, a connector including one or more connection pins for connection with an external device, at least a portion of an outside surface of the connector being formed of a conductive member, an adjusting circuit electrically connected with, at least, the portion of the outside surface of the connector formed of the conductive member, wherein an impedance of the adjusting circuit is variable, and a processor configured to, upon detecting a connection with the external device through the connector, vary the impedance of the adjusting circuit, and output the signal through the antenna, with the impedance of the adjusting circuit varied.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
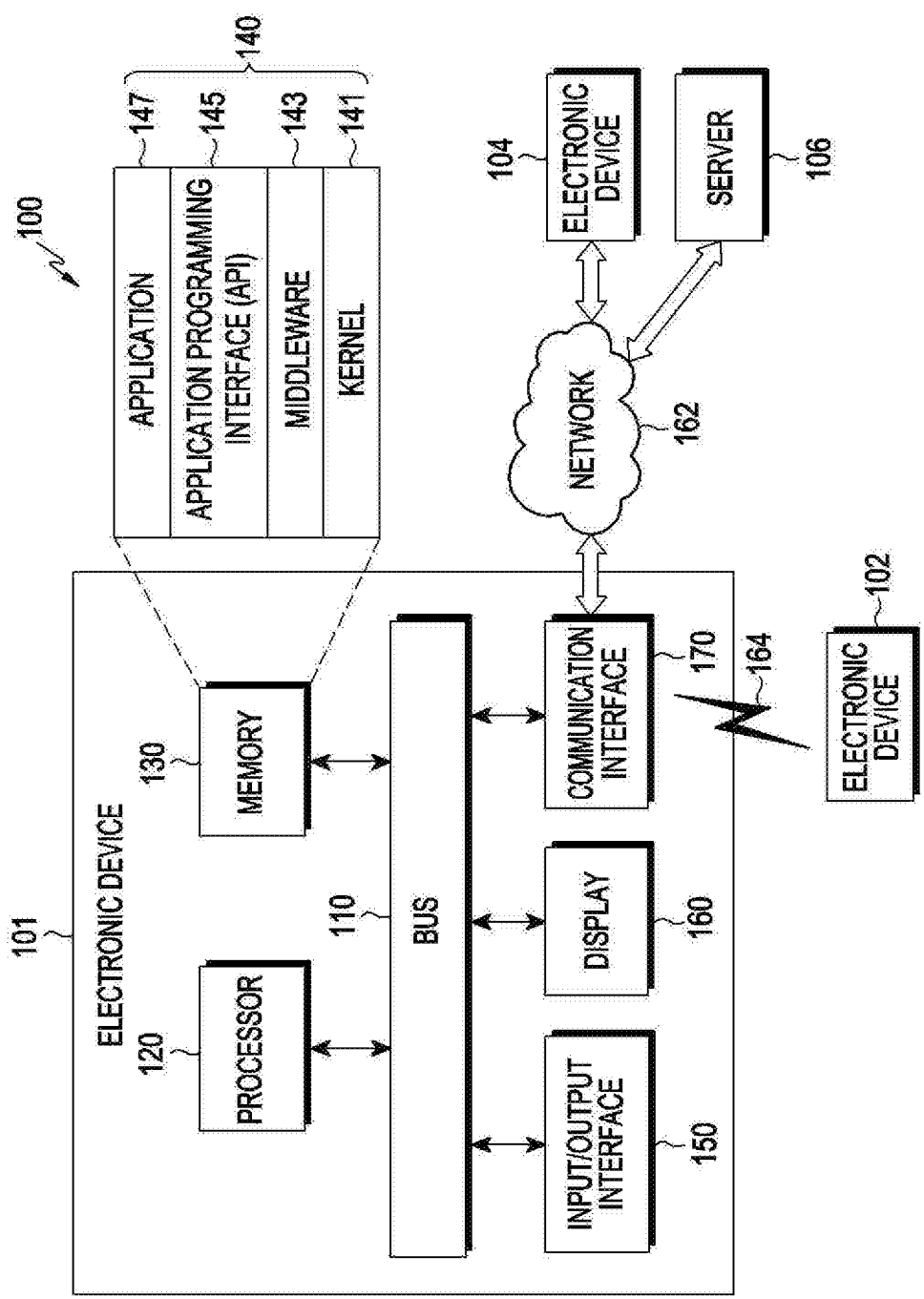
FIG. 1 illustrates a network environment including an electronic device, according to an embodiment.

Embodiments of the present disclosure are described with reference to the accompanying drawings.

The present disclosure is not limited to the embodiments and the terminology used herein, and all changes and/or equivalents or replacements thereto are also within the scope of the present disclosure. The same or similar reference numerals may be used to refer to the same or similar elements throughout the specification and the drawings.

It is to be understood that the singular forms "a," "an," and "the" include plural references unless the context clearly dictates otherwise. As used herein, the terms "A or B" "at least one of A and B" or "at least one of A or B" may include all possible combinations of A and B.

As used herein, the terms "$1^{st}$" or "first" and "$2^{nd}$" or "second" may refer to various corresponding components regardless of importance or order and are used to distinguish a component from another without limiting the components. It will be understood that when an element (e.g., a first element) is referred to as being operatively or communicatively "coupled with," "coupled to," "connected with," or "connected to" another element (e.g., a second element), it can be coupled or connected with/to the other element directly or via a third element.

As used herein, the expressions "configured to" or "designated to" may be interchangeably used with other expressions, such as "suitable for," "capable of," "modified to," "made to," "adapted to," "able to," or "designed to" in hardware or software in the context. Rather, the expression "configured to" may mean that a device can perform an operation together with another device or parts. The expression a "processor configured to perform A, B, and C" or a "processor designated to perform A, B, and C" may mean a generic-purpose processor (e.g., a central processing unit (CPU) or an application processor (AP)) that may perform the operations by executing one or more software programs stored in a memory device or a dedicated processor (e.g., an embedded processor) for performing the operations.

The electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a moving picture experts group layer-3 (MP3) player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric integrated device or a clothes-integrated device (e.g., electronic clothes), a body attaching-type device (e.g., a skin pad or tattoo), or a body implantable device.

The smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (e.g., Xbox™ or PlayStation™), an electronic dictionary, an electronic key, a camcorder, or an electronic picture frame.

The electronic device may include at least one of diverse portable medical measuring devices (e.g., a blood sugar measuring device, a heartbeat measuring device, or a body temperature measuring device), a magnetic resource angiography (MRA) device, a magnetic resource imaging (MRI) device, a computed tomography (CT) device, an imaging device, an ultrasonic device, a navigation device, a global navigation satellite system (GNSS) receiver, an event data recorder (EDR), a flight data recorder (FDR), an automotive infotainment device, a sailing electronic device (e.g., a sailing navigation device or a gyro compass), an avionics device, security devices, vehicular head units, industrial or home robots, drones, automatic teller machines (ATMs), point of sales (POS) devices, or Internet of things (IoT) devices (e.g., a light bulb, various sensors, a sprinkler, a fire alarm, a thermostat, a street light, a toaster, fitness equipment, a hot water tank, a heater, or a boiler).

Examples of the electronic device may include at least one of a part of a piece of furniture, building/structure or vehicle, an electronic board, an electronic signature receiving device, a projector, or various measurement devices (e.g., devices for measuring water, electricity, gas, or electromagnetic waves). The electronic device may be flexible or may be a combination of the above-enumerated electronic devices. The electronic device is not limited to the above-listed embodiments. As used herein, the term "user" may refer to a human or another device (e.g., an artificial intelligence electronic device) using the electronic device.

Referring to FIG. 1, according to an embodiment, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processor 120 may include one or more of a CPU, an AP, or a communication processor (CP). The processor 120 may perform control on at least one of the other components of the electronic device 101 or perform an operation or data processing relating to communication.

The memory 130 may include a volatile and/or a non-volatile memory. The memory 130 may store instructions or data related to at least one other component of the electronic device 101. The memory 130 may store software and/or a program 140. The program 140 may include a kernel 141, middleware 143, an application programming interface (API) 145, and/or an application program (or application) 147. At least a portion of the kernel 141, middleware 143, or API 145 may be referred to as an operating system (OS). For example, the kernel 141 may control or manage system resources (e.g., the bus 110, the processor 120, or the memory 130) used to perform operations or functions implemented in other programs (e.g., the middleware 143, the API 145, or the application 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141. The middleware 143 may process one or more task requests received from the application 147 according to an order of priority. For example, the middleware 143 may assign priority of using system resources (e.g., the bus 110, the processor 120, or the memory 130) of the electronic device 101 to at least one of the applications 147 and process one or more task requests. The API 145 is an interface for allowing the application 147 to control functions provided from the kernel 141 or the middleware 143. The API 133 may include at least one interface or function (e.g., a command) for filing control, window control, image processing or text control. The input/output interface 150 may transfer instructions or data input from the user or other external device to other component(s) of the electronic device 101 or may output instructions or data received from other component(s) of the electronic device 101 to the user or other external devices.

The display 160 may include a liquid crystal display (LCD), a light emitting diode (LED) display, an organic light emitting diode (OLED) display, a microelectromechanical systems (MEMS) display, or an electronic paper display. The display 160 may display text, images, videos, icons, and/or symbols to the user. The display 160 may include a touchscreen and may receive a touch, gesture, proximity or hovering input using an electronic pen or a body portion of the user. The communication interface 170 may set up communication between the electronic device 101 and a first electronic device 102, a second electronic device 104, or a server 106. For example, the communication interface 170 may be connected with the network 162 through wireless or wired communication to communicate with the second external device 104 or server 106.

The wireless communication may include cellular communication which uses at least one of long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). The wireless communication may include at least one of wireless-fidelity (Wi-Fi), light-fidelity (Li-Fi), bluetooth, bluetooth low power (BLE), Zigbee™, NFC, magnetic secure transmission (MST), radio frequency (RF), or body area network (BAN) as denoted with element 164 of FIG. 1. The wireless communication may include a global navigation satellite system (GNSS), such as a global positioning system (GPS), a global navigation satellite system (Glonass), a Beidou navigation satellite system (Beidou) or Galileo, the European global satellite-based navigation system. Hereinafter, the terms "GPS" and the "GNSS" may be interchangeably used. The wired connection may include at least one of a universal serial bus (USB), a high definition multimedia interface (HDMI), a recommended standard (RS)-232, a power line communication (PLC), or a plain old telephone service (POTS). The network 162 may include at least one telecommunication network, such as a computer network (e.g., a local area network (LAN) or a wide area network (WAN)), the Internet, or a telephone network.

The first and second external devices 102 and 104 each may be a device of the same or a different type, from the electronic device 101. According to an embodiment, all or some of the operations to be executed on the electronic device 101 may be executed on one or more of the external electronic devices 102 and 104 or server 106. When the electronic device 101 should perform a function or a service automatically, or in response to a request, the electronic device 101, instead of executing the function or service on its own or additionally, may request the electronic devices 102 and 104 or server 106 to perform at least some of the functions associated therewith. The electronic devices 102 and 104 or server 106 may execute the requested functions or additional functions and transfer a result of the execution to the electronic device 101. The electronic device 101 may provide a requested function or service by processing the received result as it is or process it in addition to other functions or services. To that end, a cloud computing, distributed computing, or client-server computing technique may be used, for example.

The electronic device 101 may include an antenna for radiating or receiving wireless signals, a connector including one or more connection pins for connection with an external device, and a conductive member for receiving signals from the connector. The antenna and the conductive member may be disposed adjacent to each other, producing a capacitive coupling between the antenna and the conductive member. The electronic device 101 may electrically be connected with the conductive member and may include an adjusting circuit configured to vary impedance. At least a portion of an outside surface of the connector may be formed of the conductive member, and the adjusting circuit may be connected to at least the portion of the outside surface of the connector which is formed of the conductive member. Specific structures of the antenna, conductive member, and adjusting circuit are described below.

The processor 120 may vary the impedance of the adjusting circuit to adjust the resonance frequency of signals radiated through the antenna. For example, when the processor 120 varies the impedance of the adjusting circuit, the impedance of the conductive member electrically connected with the adjusting circuit may vary. Where a capacitive coupling is produced between the conductive member and the antenna, the impedance variation in the conductive member may change the impedance of the antenna.

As the processor 120 varies the impedance of the adjusting circuit and hence the impedance of the antenna, the resonance frequency of signals radiated through the antenna or the reflection coefficient of the antenna may be adjusted. The processor 120 may output signals through the antenna, with the impedance of the adjusting circuit being varied. A specific method for adjusting the characteristics (e.g., resonance frequency) of signals radiated through the antenna by varying the impedance of the adjusting circuit is described below.

Adjusting the resonance frequency of signals radiated through the antenna or the reflection coefficient of the antenna may mitigate the problem of a reduction in the radiation performance of the antenna due to a connection to an external device via the conductive member or connector received in the conductive member.

Figure 2:
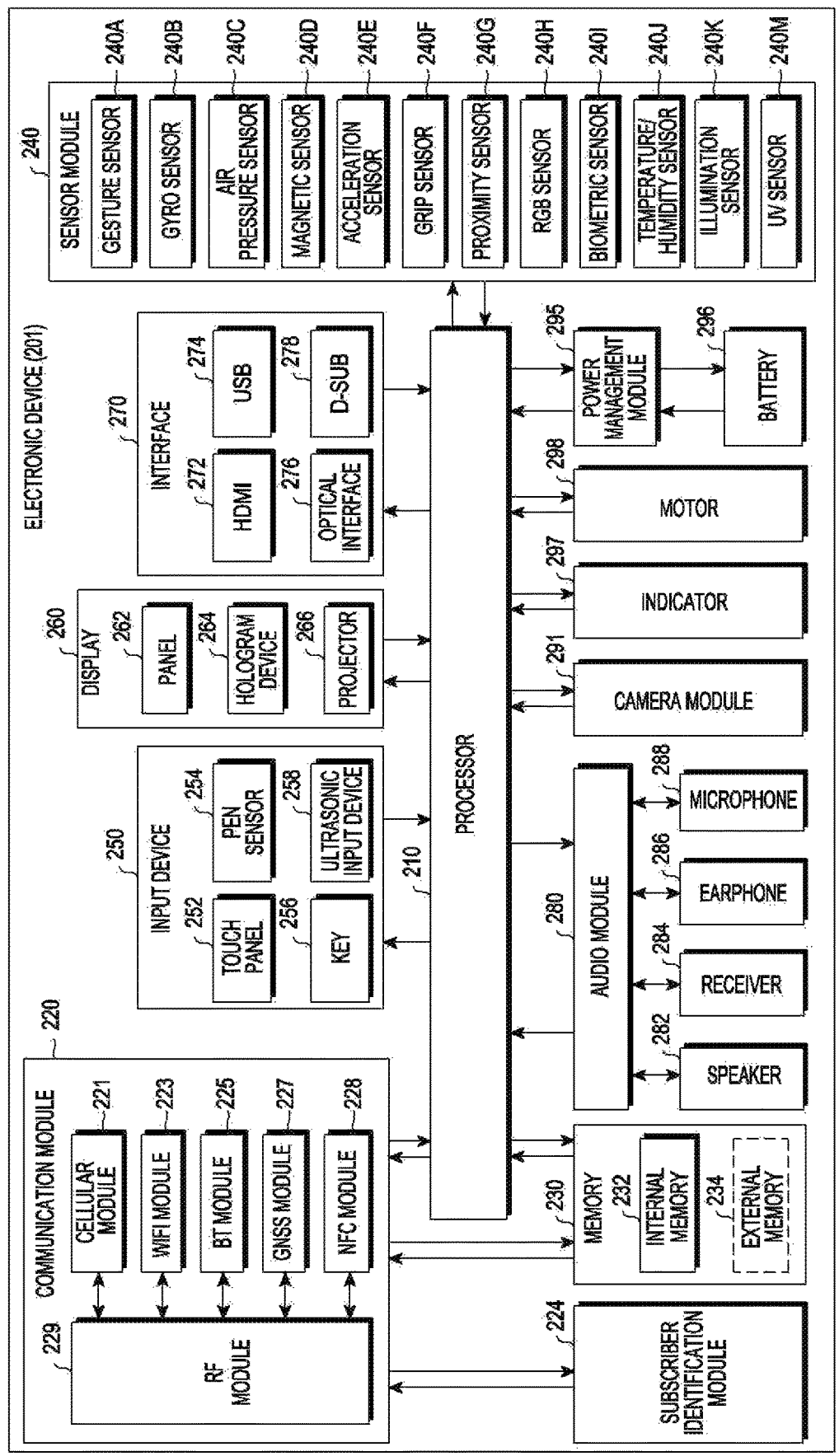
FIG. 2 is a block diagram illustrating a program module, according to an embodiment.

FIG. 2 is a block diagram illustrating an electronic device 201, according to an embodiment. An electronic device 201 may include the whole or part of the electronic device 101 of FIG. 1. The electronic device 201 may include one or more APs 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running an OS or application programs, and the processor 210 may process and compute various data. The processor 210 may be implemented in a system on chip (SoC). According to an embodiment, the processor 210 may further include a graphic processing unit (GPU) and/or an image signal processor. The processor 210 may include at least some (e.g., the cellular module 221) of the components shown in FIG. 2. The processor 210 may load a command or data received from at least one other component (e.g., a non-volatile memory) on a volatile memory, process the command or data, and store the resultant data in the non-volatile memory.

The communication module 220 may have the same or a similar configuration to the communication interface 170. The communication module 220 may include a cellular module 221, a wireless fidelity (Wi-Fi) module 223, a bluetooth (BT) module 225, a GNSS module 227, an NFC module 228, and an RF module 229. The cellular module 221 may provide voice call, video call, text, or Internet services through a communication network. According to an embodiment, the cellular module 221 may perform identification or authentication on the electronic device 201 in the communication network using a SIM 224 (e.g., the SIM card). The cellular module 221 may perform at least some of the functions providable by the processor 210. The cellular module 221 may include a CP. At least two or more of the cellular module 221, the Wi-Fi module 223, the Bluetooth module 225, the GNSS module 227, or the NFC module 228 may be included in a single integrated circuit (IC) or an IC package. The RF module 229 may transmit and receive communication signals (e.g., radio frequency (RF) signals). The RF module 229 may include a transceiver, a power amp module (PAM), a frequency filter, a low noise amplifier (LNA), or an antenna. At least one of the cellular module 221, the Wi-Fi module 223, the bluetooth module 225, the GNSS module 227, or the NFC module 228 may communicate RF signals through a separate RF module. The subscription identification module 224 may include a card including a SIM, or an embedded SIM, and may contain unique identification information (e.g., an integrated circuit card identifier (ICCID) or subscriber information (e.g., an international mobile subscriber identity (IMSI)).

The memory 230 may include an internal memory 232 or an external memory 234. For example, the internal memory 232 may include at least one of a volatile memory (e.g., a dynamic random access memory (DRAM), a static RAM (SRAM), or a synchronous dynamic RAM (SDRAM)) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash or a NOR flash), a hard drive, or solid state drive (SSD). The external memory 234 may include a flash drive, a compact flash (CF) memory, a secure digital (SD) memory, a micro-SD memory, a mini-SD memory, an extreme digital (xD) memory, a multi-media card (MMC), or a Memory Stick™. The external memory 234 may be functionally or physically connected with the electronic device 201 via various interfaces.

The sensor module 240 may measure a physical quantity or detect a motion state of the electronic device 201, and the sensor module 240 may convert the measured or detected information into an electrical signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red green blue (RGB) sensor), a bio sensor 240I, a temperature/humidity sensor 240J, an illumination sensor 240K, or an ultra violet (UV) sensor 240M. Additionally or alternatively, the sensing module 240 may include an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include a touch panel 252, a digital pen sensor 254, a key 256, or an ultrasonic input device 258. The touch panel 252 may use at least one of capacitive, resistive, infrared, or ultrasonic methods. The touch panel 252 may further include a control circuit, a tactile layer and may provide a user with a tactile reaction. The digital pen sensor 254 may include a part of a touch panel or a separate sheet for recognition. The key 256 may include a physical button, an optical key or a key pad. The ultrasonic input device 258 may sense an ultrasonic wave generated from an input tool through a microphone 288 to identify data corresponding to the sensed ultrasonic wave.

The display 260 may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment, the panel 262 may include a pressure sensor (or force sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be located inside or outside of the electronic device 201. The interface 270 may include a high definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 may include a mobile high-definition link (MHL) interface, an SD card/MMC interface, or Infrared Data Association (IrDA) standard interface.

The audio module 280 may convert a sound signal into an electrical signal and vice versa. At least a part of the audio module 280 may be included in the input/output interface 145 as shown in FIG. 1. The audio module 280 may process sound information input or output through a speaker 282, a receiver 284, an earphone 286, or the microphone 288. The camera module 291 may be a device for capturing still images and videos, and may include one or more image sensors (e.g., front and back sensors), a lens, an image signal processor (ISP), or a flash such as a light emitting diode (LED) or xenon lamp. The power manager module 295 may manage power of the electronic device 201. According to an embodiment, the power manager module 295 may include a power management IC (PMIC), a charger IC, or a battery gauge. The PMIC may have a wired and/or wireless recharging scheme. The wireless recharging scheme may include a magnetic resonance scheme, a magnetic induction scheme, or an electromagnetic wave-based scheme, and an additional circuit, such as a coil loop, a resonance circuit, or a rectifier added for wireless charging. The battery gauge may measure an amount of remaining power of the battery 296, a voltage, a current, or a temperature while the battery 296 is being charged. The battery 296 may include a rechargeable battery and/or a solar battery.

The indicator 297 may indicate a particular state of the electronic device 201 or a part (e.g., the processor 210) of the electronic device, including a booting state, a message state, or a recharging state. The motor 298 may convert an electric signal to a mechanical vibration and may generate a vibrational or haptic effect. The electronic device 201 may include a mobile TV supporting device (e.g., a GPU) that may process media data as per digital multimedia broadcasting (DMB), digital video broadcasting (DVB), or mediaFlo™ standards. Each of the aforementioned components of the electronic device may include one or more parts, and a name of the part may vary with a type of the electronic device. The electronic device 201 may exclude some elements or include more elements, or some of the elements may be combined into a single entity that may perform the same function as the elements before combined.

Figure 3:
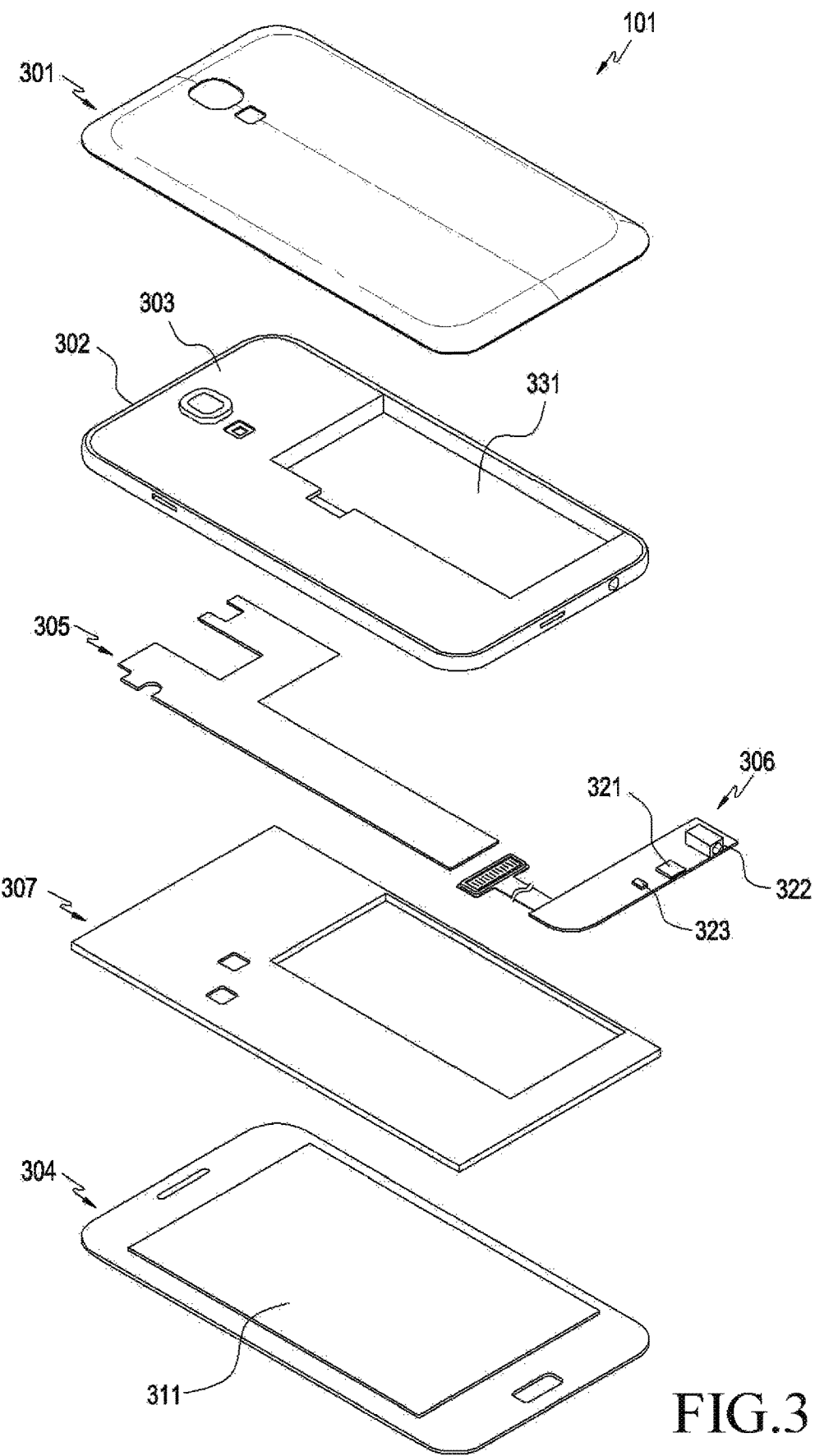
FIG. 3 is an exploded perspective view illustrating an electronic device, according to an embodiment.

FIG. 3 is an exploded perspective view illustrating an electronic device (i.e., the electronic device 101 of FIG. 1), according to an embodiment.

Referring to FIG. 3, an electronic device may include a first housing 301 forming a portion of the outside surface of the electronic device. For example, the first housing 301 may form a rear surface of the electronic device. The whole or part of the first housing 301 may be formed of a metal.

The electronic device may include a second housing 302 coupled with the first housing 301 and forming another portion of the outside surface of the electronic device. For example, the second housing 302 may form side walls of the electronic device. The first housing 301 and the second housing 302 may be configured detachably, or integrally such that the first housing 301 and the second housing 320 are not separated from each other.

The electronic device may include a case member 303 disposed on an inside surface of the second housing 320 and coupled with the second housing 302.

The case member 303 may be shaped to have a front opening and may form the rear surface while the second housing 302 may form the side walls, thereby leaving a receiving space with a front opening. The case member 303 may be formed of a synthetic resin, and the second housing 302 may, in whole or part, be formed of a metal.

The antenna for wireless communication may be formed in at least a portion of the metallic second housing 302. The antenna may be formed adjacent to the metallic second housing 302. For instance, the antenna may be attached onto circuit boards 305 and 306 in the electronic device to be positioned adjacent the second housing 302 or onto a carrier disposed on the circuit boards 305 and 306 to be positioned adjacent the second housing 302. The antenna may be implemented in various structures, such as a Yagi-Uda antenna structure, a grid-type antenna structure, a patch-type antenna structure, an inverted-F antenna structure, a monopole antenna structure, a slot antenna structure, a loop antenna structure, a horn antenna structure, or a dipole antenna structure.

The electronic device may include a front cover 304 mounted on the second housing 302. The front cover 304 may be configured of a window member combined with a display (e.g., the display 160, 260 or 411). According to an embodiment, the front cover 304 may be integrated with a touch panel, offering the functions of an input device.

The electronic device may include the circuit boards 305 and 306 accommodated in the case member 303. The circuit boards 305 and 306 may include at least one component (e.g., the processor 120 or 210, the communication module 220, the sensor module 240, the audio module 280, the power management module 295, or the memory 130 or 230) which is included in the electronic device 101 described above in connection with FIG. 1 or 2. The circuit board 305 and 306 may further include a connector (e.g., the interface 270) with one or more connection pins for connection with an external device, such as a USB connector, an earphone connector, a connector for storage, an interface connector, or a charging connector. The connector may connect to the conductive member 321 or 322, and an adjusting circuit 323 electrically connected to the conductive member 321 or 322 may be further included in the circuit boards 305 and 306. Where there are a plurality of conductive members 321 and 322, the adjusting circuit 323 may be connected to each or at least one of the conductive members 321 and 322. The adjusting circuit 323 may be electrically connected with at least a portion of the outside surface of the connector formed of a conductive member.

According to an embodiment, the conductive member 321 or 322 that accommodates the connector may be disposed adjacent the antenna. As the antenna and the conductive member 321 or 322 are disposed adjacent each other, a capacitive coupling may be produced between the conductive member 321 or 322 and the antenna.

The processor (e.g., the processor 120 or 210) included in the circuit boards 305 and 306 may vary the impedance of the adjusting circuit 323. As the processor varies the impedance of the adjusting circuit 323, the impedance of the conductive member 321 or 322 electrically connected with the adjusting circuit 323 may be varied. Where the conductive member 321 or 322 is positioned adjacent the antenna so that a capacitive coupling is produced between the antenna and the conductive member 321 or 322, the impedance of the antenna may be varied due to the impedance variation in the conductive member 321 or 322. As the impedance of the antenna varies, the resonance frequency of signals output through the antenna or the reflection coefficient of the antenna may vary. As such, the resonance frequency of signals output through the antenna or the reflection coefficient of the antenna may be varied as the processor changes the impedance of the adjusting circuit 323 electrically connected to the conductive member 321 or 322.

The circuit boards 305 and 306 may be formed to fit the shape of the space defined in the case member 303. For example, the case member 303 may have a mounting hole 331 for receiving a battery, and the circuit boards 305 and 306 may be properly shaped to surround the mounting hole 331 in the case member 303.

According to an embodiment, the electronic device may include a supporting member 307 received in the case member 303. The supporting member 307 may enhance engineering stiffness of the electronic device 101. The supporting member 307 may be disposed between the front cover 304 and the circuit boards 305 and 306, preventing the circuit boards 305 and 306 from directly contacting the front cover 304. The supporting member 307 may shield electromagnetic waves to avoid the display 311 disposed on the front cover from being influenced electromagnetic waves produced by components included in the circuit boards 305 and 306.

Figure 4:
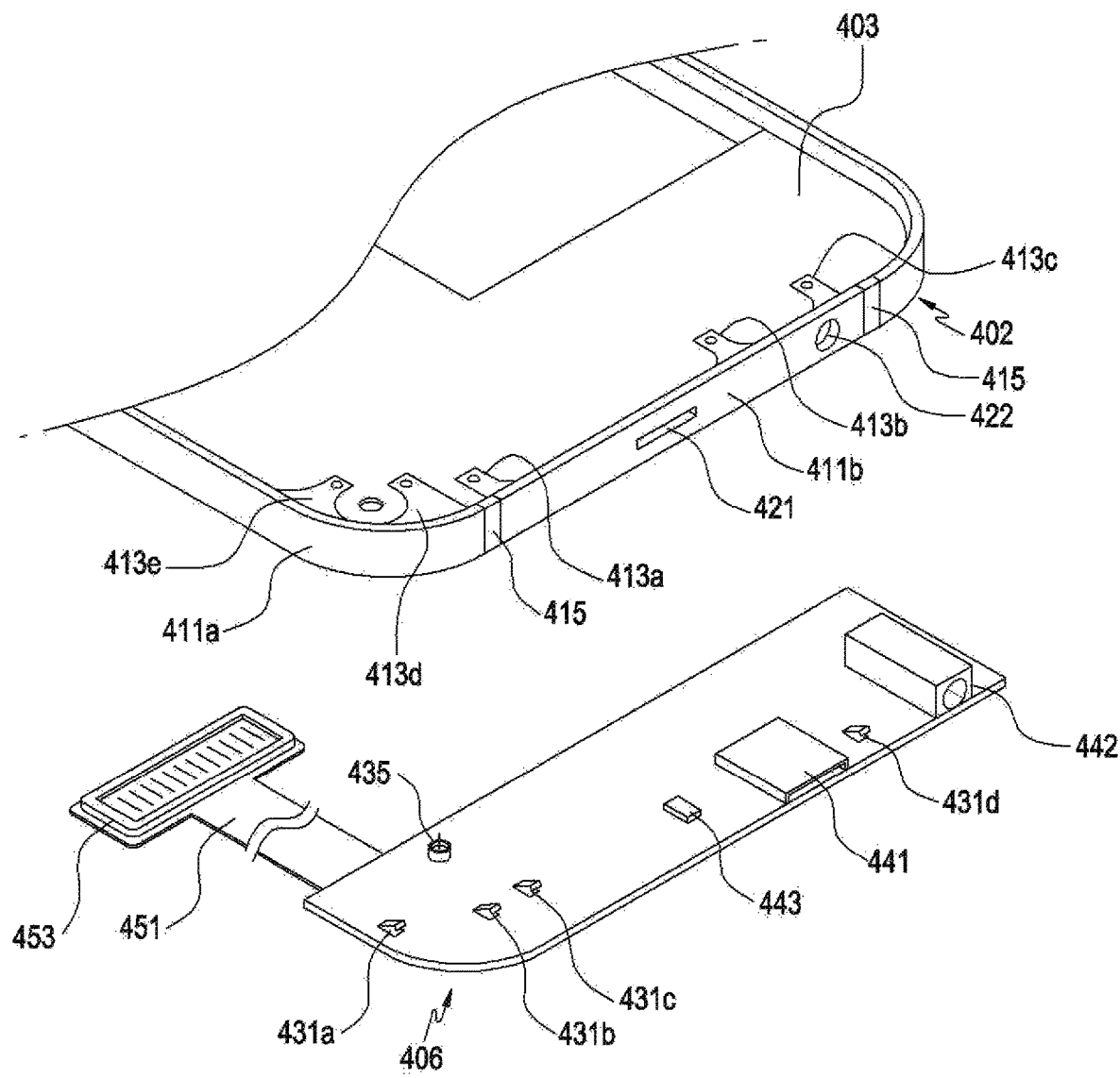
FIG. 4 is an exploded perspective view illustrating a portion of an electronic device, according to an embodiment.

FIG. 4 is an exploded perspective view illustrating a portion of an electronic device 101 according to an embodiment.

Referring to FIG. 4, an electronic device may include a case member 403 and a housing 402 disposed on one surface of the case member 403 to form side walls of the electronic device 101.

The housing 402 may be wholly or partially formed of a metal. For example, the housing 402 may include a plurality of dividing portions 415 formed of a non-metallic material and the rest formed of a metal.

For example, where the electronic device 101 includes a connector (e.g., a USB connector or earphone connector) for connection with an external device (e.g., a charger or earphone), the housing 402 may have openings 421 and 422 to provide a connection path to the connector. The connector may be disposed to partially be exposed to the outside through the openings 421 and 422 of the housing 402.

To reinforce the fastening between the case member 403 and the housing 402, the housing 402 may include a plurality of fastening pieces 413a, 413b, 413c, 413d, and 413e. For example, as the plurality of fastening pieces 413a, 413b, 413c, 413d, and 413e project inward of the housing 402 and are positioned inside the case member 403, the fastening between the housing 402 and the case member 403 may become more solid. At least one of the plurality of fastening pieces 413a, 413b, 413c, 413d, and 413e may be used as a connection piece to electrically connect part of the housing 402 to the circuit board 406.

At least one of a first portion 411a or a second portion 411b of the metallic housing 402 may be used as an antenna to output signals for wireless communication. In another example, the rest of the metallic housing 402 except for the first portion 411a or the second portion 411b may wholly or partially be used as an antenna to output signals.

According to an embodiment, the circuit board 406 may include a flexible printed circuit board or a ribbon cable 451 for connection with another circuit board 305 and a connector 453 provided at an end thereof. Where a communication module (e.g., the communication interface 170 or communication module 220) is disposed on the other circuit board, the circuit board 406 may communicate wireless communication signals with the other circuit board via the flexible printed circuit board or ribbon cable 451.

For example, the circuit board 406 may include a coaxial connector 435. Where a communication module is disposed on the other circuit board, the circuit board 406 may communicate wireless communication signals with the other circuit board via the coaxial connector 435.

According to an embodiment, the circuit board 406 may include a plurality of connection terminals 431a, 431b, 431c, and 431d (e.g., C-clips). The circuit board 406 may electrically be connected with at least one of the first portion 411a or the second portion 411b of the housing 402 which is used as an antenna through at least one of the plurality of connection terminals 431a, 431b, 431c, and 431d. For example, at least one of the first portion 411a or the second portion 411b of the housing 402 used as an antenna may be connected with a power feeding part or ground included in the circuit board 406 via at least one of the plurality of connection terminals 431a, 431b, 431c, and 431d.

The circuit board 406 may include a connector for connection with an external device (e.g., a charger or earphone). The connector may be accommodated in a conductive member 441 or 442. In another example, at least a portion of the outside surface of the connector may be formed of a conductive member. The conductive members 441 and 442 receiving connectors may be disposed such that the connectors may partially be exposed to the outside through the openings 421 and 422 of the housing 402.

The conductive members 441 and 442 may be disposed adjacent the housing 402 without contacting the housing 402, producing a capacitive coupling between the conductive members 441 and 442 and the housing 402. In another example, the conductive members 441 and 442 may be disposed to directly contact the housing 402. As such, as the conductive members 441 and 442 are disposed adjacent to the housing 402 or come in direct contact with the housing 402, an impedance variation may occur in at least one of the first portion 411a or the second portion 411b of the housing 402b used as an antenna. The impedance variation in at least one of the first portion 411a or the second portion 411b of the housing 402 used as an antenna may change the reflection coefficient of the first portion 411a or the second portion 411b of the housing 402 or the resonance frequency of signals radiated through at least one of the first portion 411a or second portion 411b of the housing 402 used as an antenna.

According to an embodiment, the circuit board 406 may include an adjusting circuit 443 electrically connected with the conductive members 441 and 442 and configured to vary impedance. Further, the adjusting circuit 443 may electrically be connected with other conductive members included in the electronic device 101 and likely influencing the characteristics of signals radiated.

According to an embodiment, a processor (e.g., the processor 120 or 210) disposed on the circuit board 406 or another circuit board electrically connected with the circuit board 406 may vary the impedance of the adjusting circuit 443. The processor may be included in a communication module for outputting signals for wireless communication or may be a separate component from the communication module. Specific methods for the processor to control the adjusting circuit 443 are described below.

Figure 5:
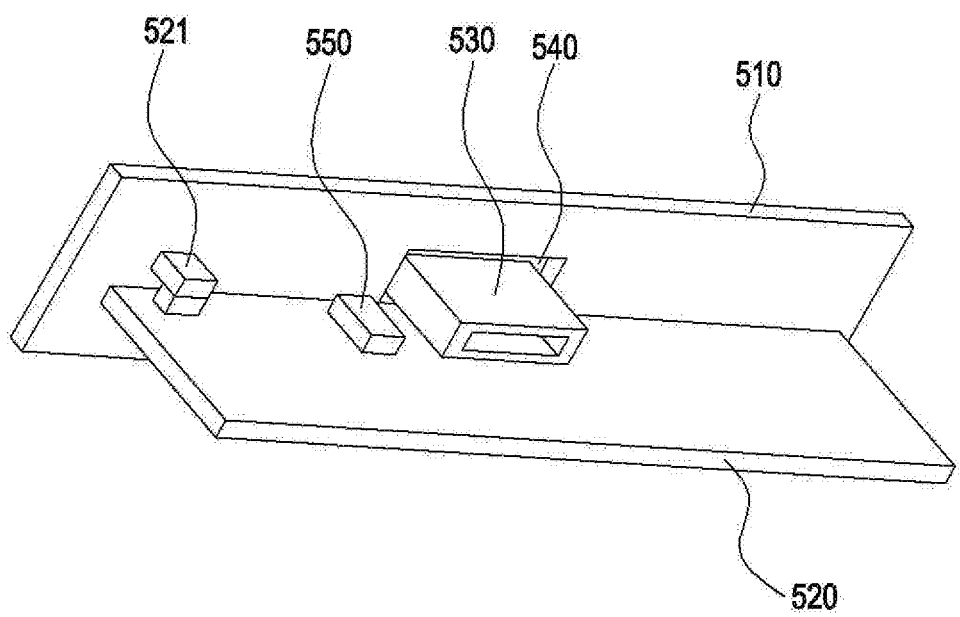
FIG. 5 illustrates a structure of an antenna included in an electronic device, according to an embodiment.

FIG. 5 is a view illustrating a structure of an antenna included in an electronic device, according to an embodiment.

A housing 302 or 402 included in an electronic device 101 may wholly or partially be formed of a metal, and at least a portion of the metallic housing may be used as an antenna.

For example, as shown in FIG. 5, a portion of the metallic housing may be used as an antenna 510. As such, the antenna 510 for wireless communication may be formed in the at least portion of the housing. The antenna 510 may electrically be connected with a circuit board 520 included in the electronic device 101 via a connection terminal 521 (e.g., a C-clip) and may thus be connected with a power feeding part or ground included in the circuit board 520.

According to an embodiment, the electronic device may include a connector for connection with an external device and a conductive member 530 receiving the connector. The conductive member 530 may shield a coupling of the antenna 510 from noise produced during the course of data communication with the external device connected via the connector.

As shown in FIG. 5, in order to provide a connection path between the external device and the connector received in the conductive member 530, a portion 540 of the antenna 510 may be shaped as an opening. The conductive member 530 may be disposed on the circuit board 520 so that the connector may partially be exposed to the outside via the opening 540 of the antenna 510. For example, the conductive member 530 may be disposed adjacent the antenna 510 without directly contacting the antenna 510 as shown in FIG. 5. In another example, the conductive member 530 may come in direct contact with the antenna 510.

As the conductive member 530 is disposed adjacent the antenna 510 as shown in FIG. 5, the conductive member 530 may affect the radiation performance of the antenna 510. For example, as the conductive member 530 is disposed adjacent the antenna 510, the impedance of the antenna 530 may be varied. Where the conductive member 530 and the antenna 510 are disposed adjacent each other without direct contact to produce a capacitive coupling between the conductive member 530 and the antenna 510, the impedance of the antenna 510 may be varied by the conductive member 530. As the impedance of the antenna 510 varies, the resonance frequency of signals radiated through the antenna 530 or the reflection coefficient of the antenna 530 may vary, deteriorating the radiation performance of the antenna 530.

In another example, as the electronic device 101 is connected with an external device via the connector received in the conductive member 530, the radiation performance of the antenna 510 may be influenced. For example, as a connection means (e.g., a connection part of a USB cable or an earphone jack) of the external device or the external device connects to the connector, the external device and the electronic device 101 may connect together. Where the connection means of the external device or the external device connects to the connector, the electronic device or the connection means of the external device such as the conductive member may also be positioned adjacent the antenna 530. As the external device or the connection means of the external device is disposed adjacent the antenna 530, the external device or the connection means of the external device may have an electrical influence on the antenna 530. For example, a capacitive coupling may be produced between the external device or the connection means of the external device and the antenna 530, and the impedance of the antenna 530 may be varied by the external device or the connection means of the external device. As the impedance of the antenna 530 varies, the resonance frequency of signals radiated through the antenna 530 or the reflection coefficient of the antenna 530 may vary, deteriorating the radiation performance of the antenna 530.

According to an embodiment, the electronic device may include an adjusting circuit 550 electrically connected with the conductive member 530 and configured to vary impedance. As shown in FIG. 5, the adjusting circuit 550 may electrically be connected with the conductive member 530 and may be included in the circuit board 520. In another example, where another conductive member is further included in the circuit board 520, the adjusting circuit 550 may electrically be connected with the other conductive member.

According to an embodiment, a processor included in the electronic device 101 may vary the impedance of the adjusting circuit 550 to mitigate a lowering of radiation performance of the antenna 530 due to connection to an external device via the conductive member 530 or connector received in the conductive member 530. For example, as the processor varies the impedance of the adjusting circuit 550, the impedance of the conductive member 530 electrically connected with the adjusting circuit 550 may vary. Where the conductive member 530 and the antenna 510 are disposed adjacent to each other to produce a capacitive coupling between the conductive member 530 and the antenna 510, the impedance of the antenna 510 may be varied due to an impedance variation in the conductive member 530. As the impedance of the antenna 510 varies, the resonance frequency of signals radiated through the antenna 510 or the reflection coefficient of the antenna 510 may be adjusted. As such, the processor may vary the impedance of the adjusting circuit 550 by adjusting the reflection coefficient of the antenna 510 or the resonance frequency of signals radiated through the antenna 510. The processor may output signals through the antenna 510 with the impedance of the adjusting circuit 550 varied. Specific methods for the processor to control the adjusting circuit 550 are described below.

Figure 6A:
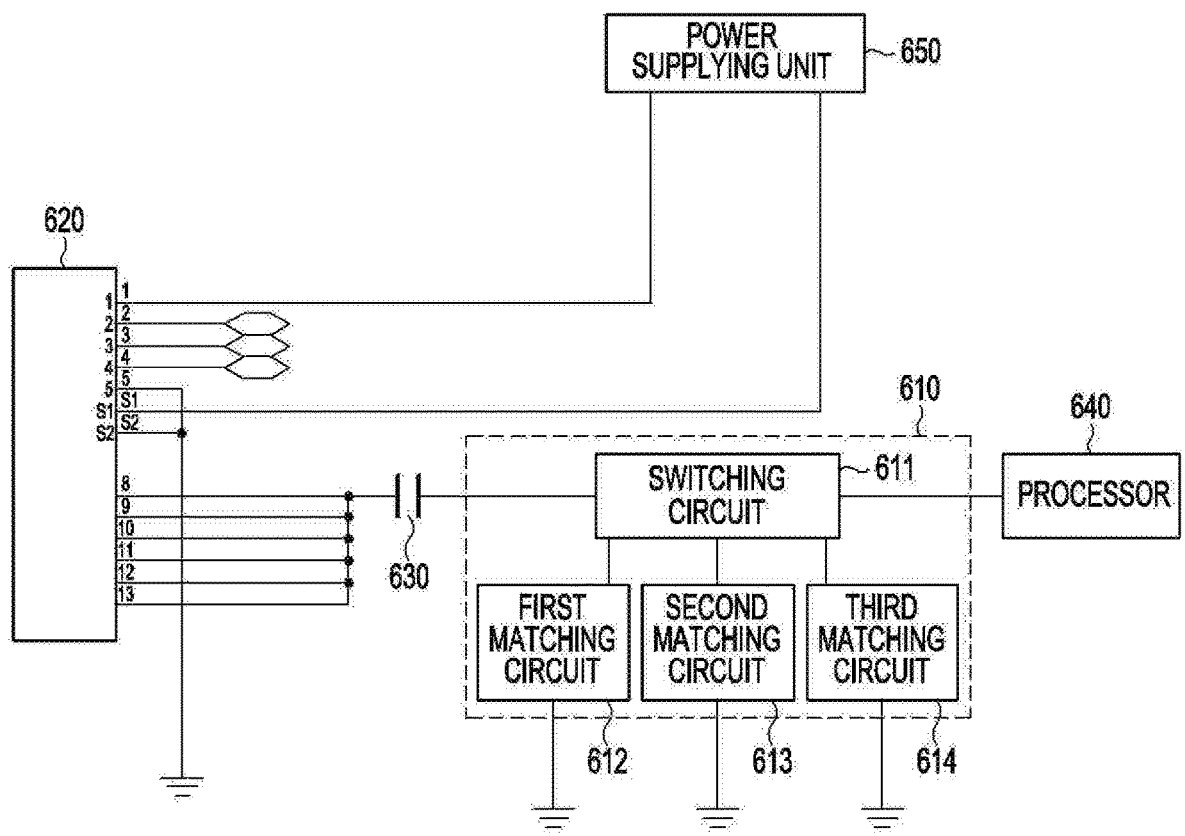
FIGS. 6A to 6C are circuit diagrams illustrating an adjusting circuit, according to an embodiment.
Figure 6B:
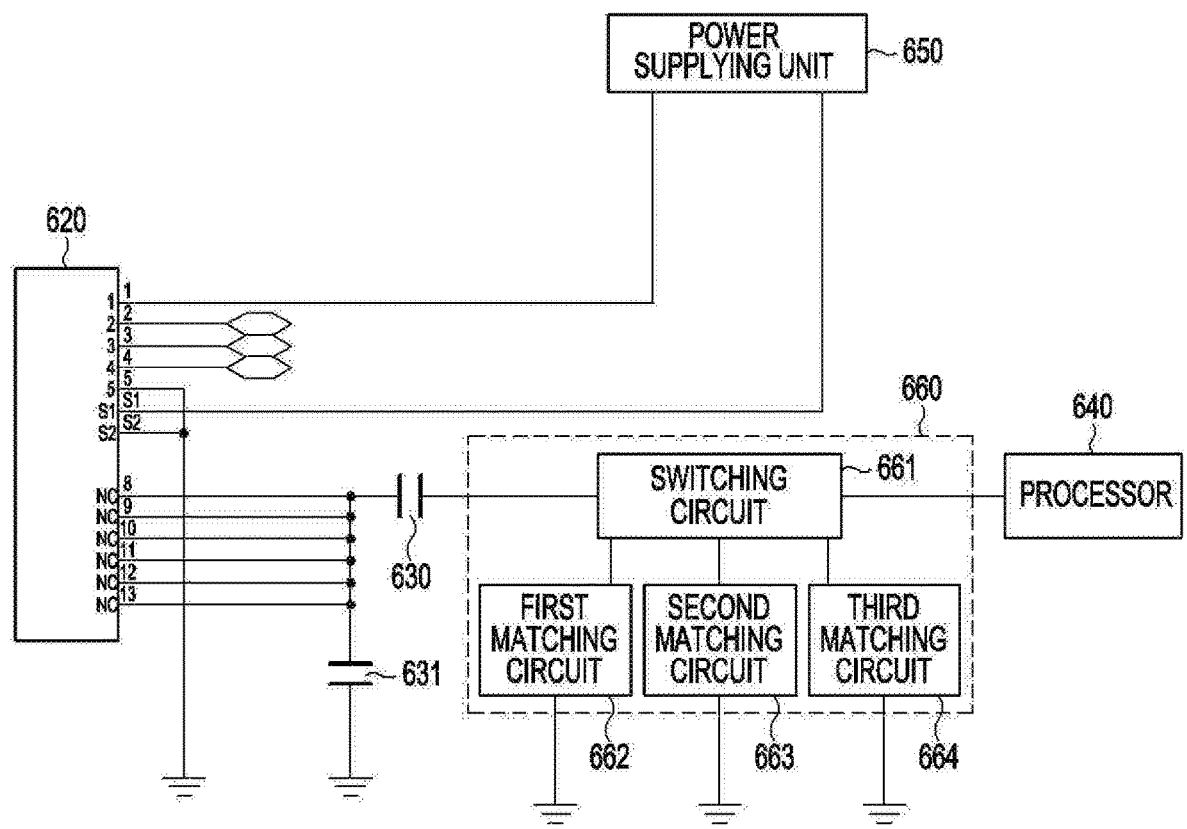
Figure 6C:
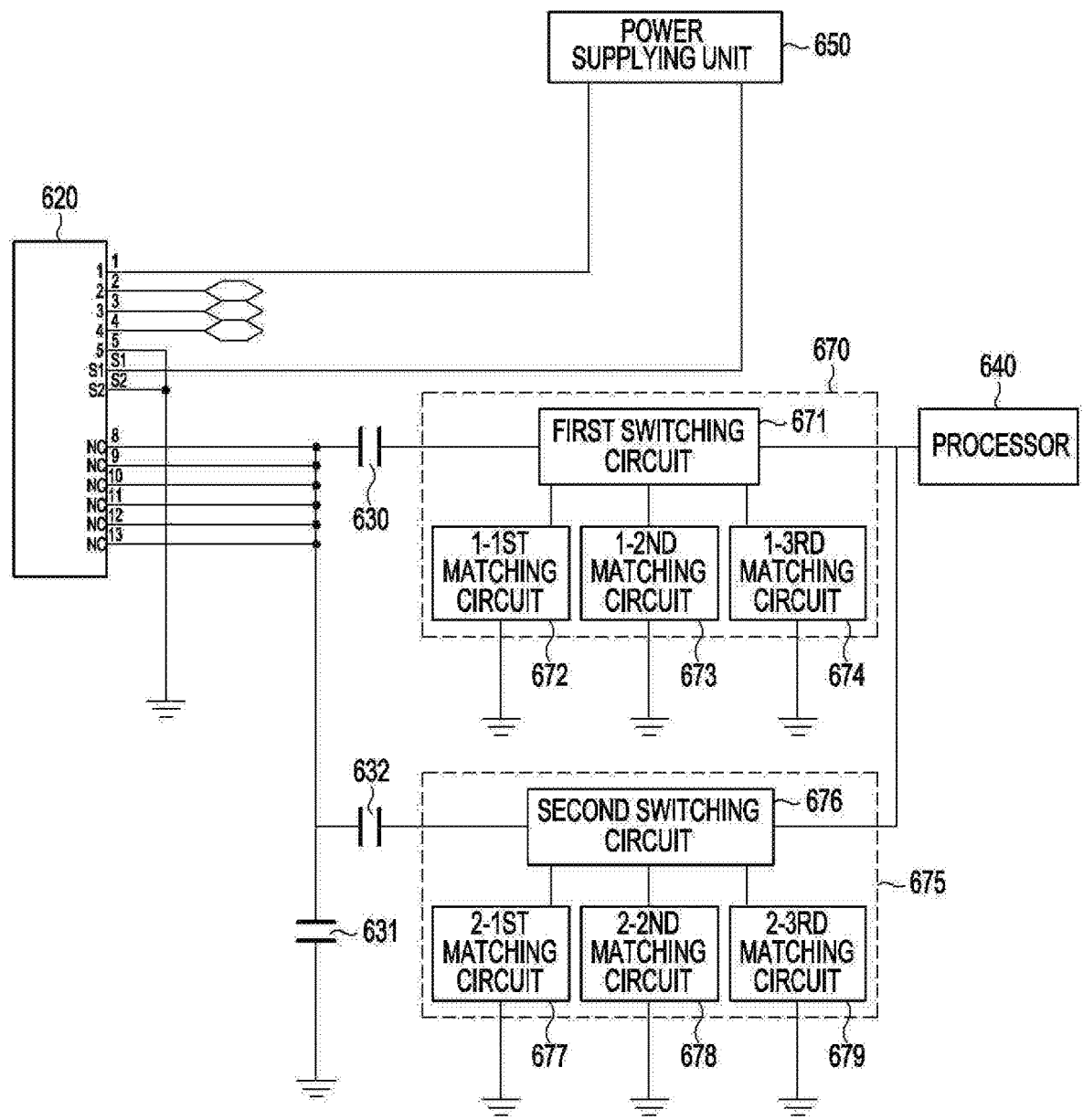

FIGS. 6A to 6C are circuit diagrams illustrating an adjusting circuit, according to an embodiment.

Referring to FIG. 6A, an adjusting circuit 610 may electrically be connected with a conductive member 620 receiving a connector. The adjusting circuit 610 may be controlled by a processor 640. The processor 640 may be included in a communication module for outputting signals for wireless communication or may be a separate component from the communication module. One of a plurality of connectors (e.g., a USB connector or earphone connector) included in the electronic device 101 may be connected to the conductive member 620.

The connector accommodated in the conductive member 620 may be connected with a power supplying unit 650 included in the electronic device 101, supplying power from the power supplying unit 650 to the connector received in the conductive member 620.

According to an embodiment, the electronic device may include a first filter circuit 630 connected to the adjusting circuit 610 and the conductive member 620. The first filter circuit 630 may be configured with a capacitor that may not transmit direct current (DC) power but can transmit signals of a particular frequency band for wireless communication. As the connector accommodated in the conductive member 620 is connected to the ground of the electronic device 101 via the first filter circuit 630, a short circuit may be prevented from occurring inside the connector received in the conductive member 620.

According to an embodiment, the adjusting circuit 610 may include a plurality of matching circuits 612, 613, and 614 for selective connection to the conductive member 620 of the electronic device and a switching circuit 611 for connecting the conductive member 620 to at least one of the plurality of matching circuits 612, 613, and 614. For example, the plurality of matching circuits 612, 613, and 614 may have different impedances. Each matching circuit may include at least one of a resistor, a capacitor, or an inductor, or the matching circuit may directly be connected to the ground of the electronic device 101 without including at least one of a resistor, a capacitor, or an inductor. In another example, the matching circuit may be an open circuit without connection with the ground of the electronic device 101.

Each of the plurality of matching circuits 612, 613, and 614 may be connected with a different area of the ground of the electronic device 101. For example, a first matching circuit 612, a second matching circuit 613, and a third matching circuit 614 may be connected with a first area, a second area, and a third area, respectively, of the ground. As each of the plurality of matching circuits 612, 613, and 614 is connected with a different area of the ground, the connecting lines between the plurality of matching circuits 612, and 613, and 614 and the ground may have different lengths, and the plurality of matching circuits 612, 613, and 614 may have different impedances based on the impedances of the connecting lines.

Where a plurality of grounds are present in the electronic device, the plurality of matching circuits 612, 613, and 614 each may be connected to the different grounds. For example, the first matching circuit 612, the second matching circuit 613, and the third matching circuit 615 may be connected to a first ground, a second ground, and a third ground, respectively. As each of the plurality of matching circuits 612, 613, and 614 is connected with a different ground, the connecting lines between the plurality of matching circuits 612, and 613, and 614 and the different grounds may have different lengths, and the plurality of matching circuits 612, 613, and 614 may have different impedances based on the impedances of the connecting lines.

The switching circuit 611 may connect at least one of the plurality of matching circuits 612, 613, and 614 to the conductive member 620 under the control of the processor 640 of the electronic device. As the conductive member 620 connects to at least one matching circuit, the impedance of the conductive member 620 may vary.

For example, as described above in connection with FIGS. 4 and 5, as the conductive member 620 is disposed adjacent the antenna of the electronic device, a capacitive coupling may be produced between the conductive member 620 and the antenna and the at least one matching circuit connects to the conductive member 620, varying the impedance of the conductive member 620 and resultantly the impedance of the antenna.

For example, a first impedance which is the impedance of the antenna varied due to an impedance variation in the conductive member 620 caused by a connection of the first matching circuit 612 to the conductive member 620 through the switching circuit 611 may differ from a second impedance which is the impedance of the antenna varied due to an impedance variation in the conductive member 620 caused by a connection the second matching circuit 613 to the conductive member 620 through the switching circuit 611. In another example, a third impedance which is the impedance of the antenna varied due to an impedance variation in the conductive member 620 caused by connection of the first matching circuit 612 and the third matching circuit 614 to the conductive member 620 may differ from the first impedance and the second impedance.

As the impedance of the antenna varies, the resonance frequency of signals radiated through the antenna or the reflection coefficient of the antenna may change. The processor 640 may choose at least one of the plurality of matching circuits 612, 613, and 614 based on the reflection coefficient of the antenna or the signal resonance frequency for optimizing the performance of the antenna and connect the chosen matching circuit to the conductive member 620 via the switching circuit 611.

According to an embodiment, the processor 640 may identify context information related to the antenna and control the switching circuit 611 to vary the impedance of the adjusting circuit 610 based on the identified context information related to the antenna. The antenna-related context information may represent information about a context influencing the impedance of the antenna and may include at least one of information about the frequency band of a signal to be output through the antenna, information indicating whether connection with an external device has been detected, or information about the reflection coefficient of the antenna.

Where the identified antenna-related context information corresponds to a plurality of designated conditions to vary the impedance of the adjusting circuit 610, the processor 640 may control the switching circuit 611 to vary the impedance of the adjusting circuit 610. The processor 640 may enable signals to be output through the antenna with the impedance of the adjusting circuit 610 varied.

According to an embodiment, the processor 640 may identify the frequency band of signals to be output through the antenna. The processor 640 may choose at least one of the plurality of matching circuits 612, 613, and 614 based on the identified frequency band. Depending on the frequency band of signals to be output through the antenna, the antenna reflection coefficient or the resonance frequency for optimizing the performance of the antenna may be varied. Thus, in order to optimize the performance of the antenna in each of a plurality of frequency bands available for communication through the antenna supported by the electronic device, at least one matching circuit may be set corresponding to each of the plurality of available frequency bands. The processor 640 may identify at least one frequency band corresponding to the signal frequency band among the plurality of available frequency bands and control the switching circuit 611 to allow the at least one matching circuit identified to connect to the conductive member 620.

For example, a setting may be made such that the first matching circuit 612, the second matching circuit 613, and the third matching circuit 614 correspond to a first frequency band, a second frequency band, and a third frequency band, respectively. In this case, upon identifying that a signal of the first frequency band is output through the communication module of the electronic device 101, the processor 640 may control the switching circuit 611 to connect the first matching circuit 612 to the conductive member 620. In another example, upon identifying that a signal of the second frequency band is output through the communication module, the processor 640 may control the switching circuit 611 to connect the second matching circuit 613 to the conductive member 620.

In another example, the first matching circuit 612 and the third matching circuit 614 may be set to correspond to a fourth frequency band. In this case, upon identifying that a signal of the fourth frequency band is output through the communication module, the processor 640 may control the switching circuit 611 to connect the first and third matching circuits 612 and 614 to the conductive member 620.

According to an embodiment, upon detecting a connection with an external device via the connector that is accommodated in the conductive member 620, the processor 640 may select at least one of the plurality of matching circuits 612, 613, and 614. When connected with an external device via the connector, the impedance of the antenna may be varied due to the connection with the external device.

When the external device connects to the connector via a connection means (e.g., a USB cable) that is connectable with the connector, the degree of impedance variation in the antenna due to the connection with the external device may be within a designated range because only finite types of connection means are connectable to the connector. In another example, where the external device is directly connected with the connector, since the types of electronic devices directly connectable to the connector are limited, the degree of impedance variation of the antenna due to the connection with the electronic device is also limited to a designated range. Accordingly, the processor 640 may designate at least one matching circuit, among the plurality of matching circuits 612, 613, and 614, to turn the varied antenna impedance back to the antenna impedance before connection to the external device.

For example, upon detecting a connection with an external device via the connector, the processor 640 may select the at least one designated matching circuit for connection with the conductive member 620. The processor 640 may control the switching circuit 611 to connect the at least one matching circuit selected to the conductive member 620. As the at least one selected matching circuit connects to the conductive member 620, the impedance of the conductive member 620 varies, and as the impedance of the conductive member 620 varies, the impedance of the antenna which produces a capacitive coupling with the conductive member 620 may change back to the antenna impedance before connection to the external device.

In another example, upon sensing the connection with an external device via the connector, the processor 640 may choose at least one of the plurality of matching circuits 612, 613, and 614 based on a signal output through the antenna and a reflection signal of the signal output through the antenna. The processor 640 may identify the reflection coefficient of the antenna as per the signal output through the antenna and the reflection signal using a coupler connected with the antenna included in the electronic device. The processor 640 may select at least one matching circuit among the plurality of matching circuits 612, 613, and 614 based on the identified reflection coefficient of the antenna.

The processor 640 may periodically identify the reflection coefficient of the antenna, and upon detecting the connection with the external device, the processor 640 may identify the reflection coefficient of the antenna.

Where the antenna reflection coefficient identified upon detecting the connection with the external device differs from the reflection coefficient identified before the connection with the external device, the processor 640 may select at least one among the plurality of matching circuits 612, 613, and 614 so that the antenna reflection coefficient identified upon detecting the connector with the external device is varied to a designated reflection coefficient (e.g., a reflection coefficient corresponding to an origin of the Smith chart) or a reflection coefficient close to the designated reflection coefficient.

According to an embodiment, even when a connection with the external device is not detected, upon identifying that the reflection coefficient of the antenna varies, the processor 640 may select at least one matching circuit among the plurality of matching circuits 612, 613, and 614 based on the signal output through the antenna and its reflection.

For example, the processor 640 may choose at least one matching circuit among the plurality of matching circuits 612, 613, and 614 so that the varied antenna reflection coefficient identified through the signal output through the antenna causes the reflection to change to the designated reflection coefficient or a reflection coefficient close to the designated reflection coefficient.

According to an embodiment, referring to FIG. 6B, the electronic device 101 may further include a second filter circuit 631 connected to the ground of the electronic device and the conductive member 620. Like the first filter circuit 630, the second filter circuit 631 may be configured with a capacitor that may not transmit direct current (DC) power but can transmit signals of a particular frequency band for wireless communication. As the connector accommodated in the conductive member 620 is connected to the ground of the electronic device via the first filter circuit 630 or the second filter circuit 631, a short circuit may be prevented from occurring inside the connector received in the conductive member 620.

For example, the second filter circuit 631, because it also connects to the conductive member 620, may impact the impedance of the conductive member 620. Hence, by adding the second filter circuit 631, the impedance of each of the plurality of matching circuits 662, 663, and 664 included in the adjusting circuit 660 may differ from the impedance of the plurality of matching circuits 612, 613, and 614 of FIG. 6A.

According to an embodiment, referring to FIG. 6C, the electronic device may include a plurality of adjusting circuits 670 and 675. The plurality of adjusting circuits 670 and 675 may connect with the conductive member 620 via the first and third filter circuits 630 and 632. The plurality of adjusting circuits 670 and 675 may include a plurality of matching circuits 672, 673, 674, 677, 678, and 679 and switching circuits 671 and 676 to connect at least one of the plurality of matching circuits 672, 673, 674, 677, 678, and 679 with the conductive member 620. The processor 640 may control the respective switching circuits 671 and 676 of the adjusting circuits 670 and 675 to connect at least one of the plurality of matching circuits 672, 673, 674, 677, 678, and 679 with the conductive member 620. Specific methods for the processor 640 to control the switching circuits 671 and 676 are the same as those described above in connection with FIG. 6A.

Figure 7:
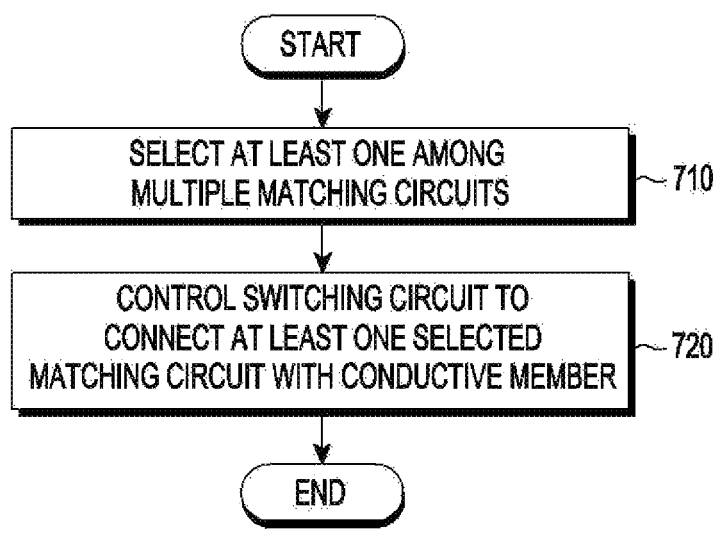
FIG. 7 is a flowchart illustrating a method of operating an electronic device, according to an embodiment.

FIG. 7 is a flowchart illustrating a method of operating an electronic device, according to an embodiment.

In step 710, a processor of an electronic device 101 may select at least one among a plurality of matching circuits 612, 613, and 614 included in an adjusting circuit 610 of the electronic device 101 based on the frequency band of a signal to be output through an antenna 510, and connect with an external device via a connector accommodated in a conductive member 620 or a varied antenna reflection coefficient. Methods for the processor to select at least one among the plurality of matching circuits are the same as those described above.

In step 720, the processor may control a switching circuit 611 included in the adjusting circuit to connect the at least one selected matching circuit to the conductive member disposed adjacent to the antenna. As the at least one selected matching circuit connects with the conductive member, the impedance of the conductive member may vary. As the impedance of the conductive member varies, the impedance of the antenna which produces a capacitive coupling with the conductive member may change. As the impedance of the antenna varies, the resonance frequency of signals radiated through the antenna or the reflection coefficient of the antenna may change.

Figure 8A:
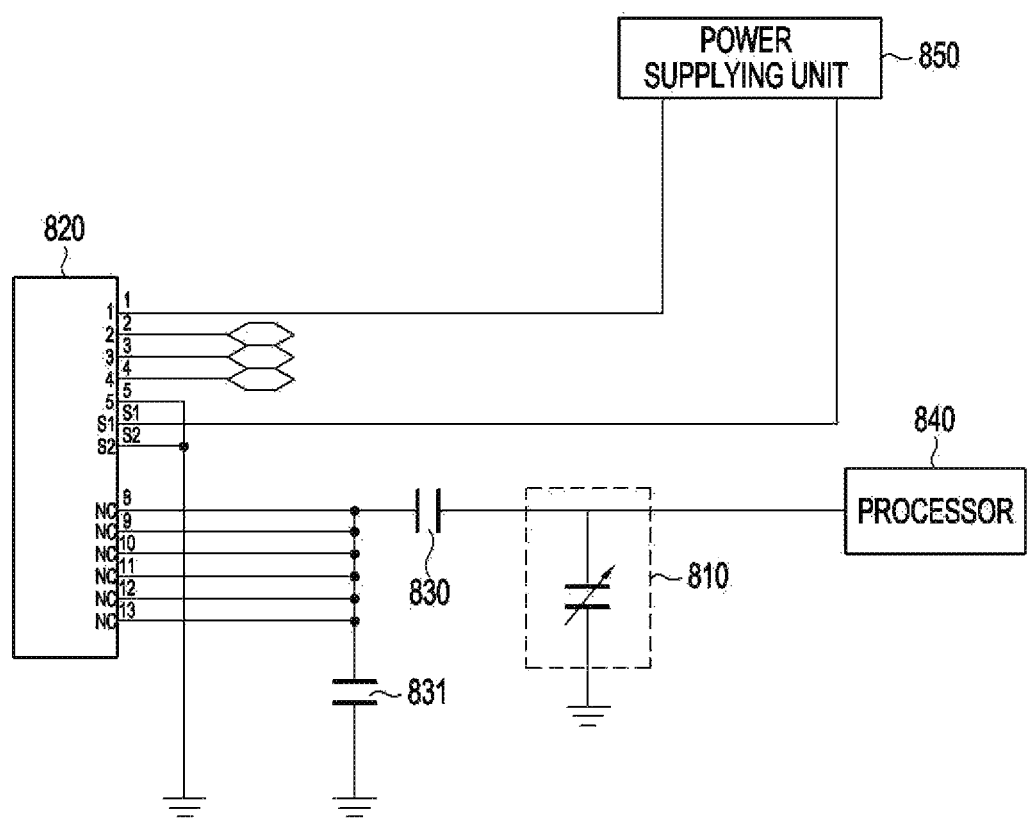
FIGS. 8A and 8B are circuit diagrams illustrating an adjusting circuit, according to an embodiment.
Figure 8B:
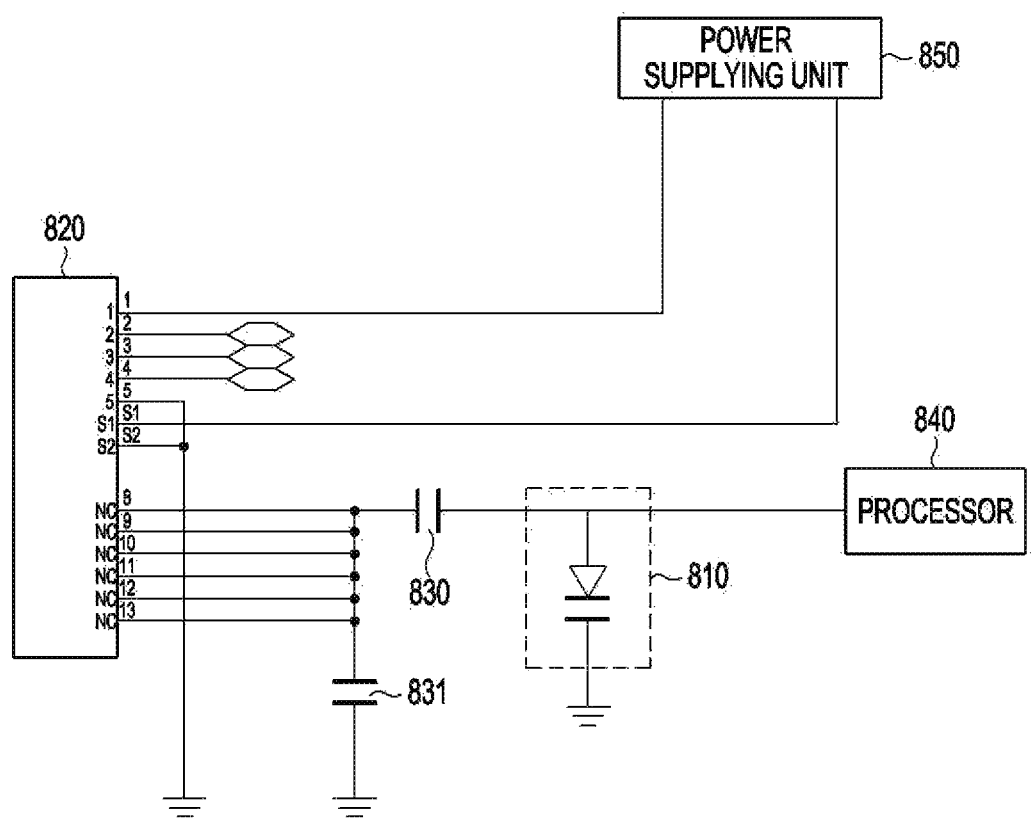

FIGS. 8A and 8B are circuit diagrams illustrating an adjusting circuit, according to an embodiment.

Referring to FIG. 8A, an adjusting circuit 810 may electrically be connected with a conductive member 820 accommodating a connector. The adjusting circuit 810 may be controlled by a processor 840. The processor 840 may be included in a communication module for outputting signals for wireless communication or may be a separate component from the communication module. For ease of description, the following description is based on an example in which the connector accommodated in the conductive member 820 is a USB connector, but embodiments of the present disclosure are not limited thereto. For example, one of a plurality of connectors (e.g., a USB connector or earphone connector) included in the electronic device 101 may be accommodated in the conductive member 820.

The connector accommodated in the conductive member 820 may be connected with a power supplying unit 850 included in the electronic device 101, supplying power from the power supplying unit 850 to the connector accommodated in the conductive member 820.

According to an embodiment of the present disclosure, the electronic device 101 may include a first filter circuit 830 connected with the adjusting circuit 810 and the conductive member 820 and a second filter circuit 831 connected with the ground of the electronic device and the conductive member 820. The first filter circuit 830 and the second filter circuit 831 may be configured with a capacitor that may not transmit direct current (DC) power but can transmit signals of a particular frequency band for wireless communication. As the connector received in the conductive member 820 is connected to the ground of the electronic device 101 via the first filter circuit 830 or the second filter circuit 831, a short circuit may be prevented from occurring inside the connector accommodated in the conductive member 820.

The adjusting circuit 810 may include a variable capacitor as shown in FIG. 8A and a varactor as shown in FIG. 8B. In another example, the adjusting circuit 810 may include a plurality of variable capacitors and/or a plurality of varactors. The adjusting circuit 810 may further include at least one switch to connect at least one variable capacitor and/or at least one varactor among a plurality of variable capacitors and/or a plurality of varactors to the conductive member 820. The following description focuses primarily on the adjusting circuit 810 including at least one of a variable capacitor and a varactor, but embodiments of the present disclosure are not limited thereto. For example, the adjusting circuit 810 may include other various devices capable of varying impedance other than the variable capacitor or varactor.

As described above in connection with FIGS. 4 and 5, as the conductive member 820 is disposed adjacent the antenna of the electronic device 101, a capacitive coupling may be produced between the conductive member 820 and the antenna. When a capacitive coupling is produced between the conductive member 820 and the antenna, a variation in impedance of the variable capacitor or varactor in the adjusting circuit 820 occurs, varying the impedance of the conductive member 820 and resultantly the impedance of the antenna.

As the impedance of the antenna varies, the resonance frequency of signals radiated through the antenna or the reflection coefficient of the antenna may change. The processor 840 may control at least one of the variable capacitor and the varactor in the adjusting circuit 810 based on the reflection coefficient of the antenna or the resonance frequency of signals to optimize the performance of the antenna.

The processor 840 may identify context information related to the antenna and control at least one of the variable capacitor or varactor to vary the impedance of the adjusting circuit 810 based on the identified context information related to the antenna. The antenna-related context information may represent information about a context influencing the impedance of the antenna. For example, the antenna-related context information may include at least one of information about the frequency band of a signal to be output through the antenna, information indicating whether connection with an external device has been detected, or information about the reflection coefficient of the antenna.

Where the antenna-related context information identified corresponds to a plurality of designated conditions to vary the impedance of the adjusting circuit 810, the processor 840 may control at least one of the variable capacitor and the varactor to vary the impedance of the adjusting circuit 810. The processor 840 may enable signals to be output through the antenna with the impedance of the adjusting circuit 810 being varied.

According to an embodiment, the processor 840 may control the variable capacitor or varactor based on the frequency band of signals to be output through the antenna. To optimize the performance of the antenna, the processor 840 may control at least one of the variable capacitor and the varactor to change the impedance of the adjusting circuit 810 based on the signal frequency band.

For instance, to optimize the performance of the antenna, the processor 840 may determine the impedance of the adjusting circuit 810 based on the signal frequency band and control at least one of the variable capacitor and the varactor to change the impedance of the adjusting circuit 810 to the impedance determined based on the signal frequency band.

The processor 840 may determine the impedance of the adjusting circuit 810 based on information representing the optimal impedance of the adjusting circuit 810 per available frequency band as stored in the memory of the electronic device 101 or as provided by the communication environment of the frequency band currently being used. However, the processor 840 may determine the impedance of the adjusting circuit 810 that gives the optimal antenna performance in the frequency band currently being used in various other manners.

According to an embodiment, upon detecting a connection with an external device via the connector accommodated in the conductive member 820, the processor 840 may control at least one of the variable capacitor and the varactor. When connected with an external device via the connector, the impedance of the antenna may be varied due to the connection with the external device.

For example, when the external device is connected to the connector via a connection means (e.g., a USB cable) that is connectable with the connector, the degree of impedance variation in the antenna due to the connection with the external device may be within a designated range because only finite types of connection means are connectable to the connector. In another example, where the external device is directly connected with the connector, since the types of electronic devices directly connectable to the connector are limited, the degree of impedance variation of the antenna due to a connection with the electronic device is also limited to a designated range. Accordingly, the processor 840 may designate the impedance of the adjusting circuit 810 to change the varied antenna impedance to the antenna impedance before connecting to the external device.

For example, upon sensing a connection with the external device via the connector, the processor 840 may control at least one of the variable capacitor and the varactor so that the impedance of the adjusting circuit 810 changes to the designated impedance of the adjusting circuit 810. As the impedance of the adjusting circuit 810 changes to the designated impedance of the adjusting circuit 810, the impedance of the conductive member 820 connected with the adjusting circuit 810 may vary. As the impedance of the conductive member 820 varies, the impedance of the antenna which produces a capacitive coupling with the conductive member 820 may be changed to the antenna impedance before connection with the external device.

In another example, upon sensing a connection with an external device via the connector, the processor 840 may control at least one of the variable capacitor and the varactor based on a signal output through the antenna and the reflection signal of the signal output through the antenna. The processor 840 may identify the reflection coefficient of the antenna using the signal output through the antenna and the reflection signal. The processor 840 may control at least one of the variable capacitor and the varactor based on the identified reflection coefficient.

The processor 840 may periodically identify the reflection coefficient of the antenna, and upon detecting connection with the external device, the processor 840 may identify the reflection coefficient of the antenna.

For example, where the antenna reflection coefficient identified upon detecting a connection with the external device differs from the reflection coefficient identified before the connection with the external device, the processor 840 may control at least one of the variable capacitor and the varactor so that the antenna reflection coefficient identified upon detecting the connector with the external device is varied to a designated reflection coefficient (e.g., a reflection coefficient corresponding to the Smith chart) or a reflection coefficient close to the designated reflection coefficient.

Even when a connection with an external device is not detected, upon identifying that the reflection coefficient of the antenna varies, the processor 840 may control at least one of the variable capacitor and varactor based on the signal output through the antenna and its reflection.

For example, the processor 840 may control at least one of the variable capacitor and the varactor so that the varied antenna reflection coefficient identified through the signal output through the antenna and the reflection changes to the designated reflection coefficient or the reflection coefficient close to the designated reflection coefficient.

Figure 9A:
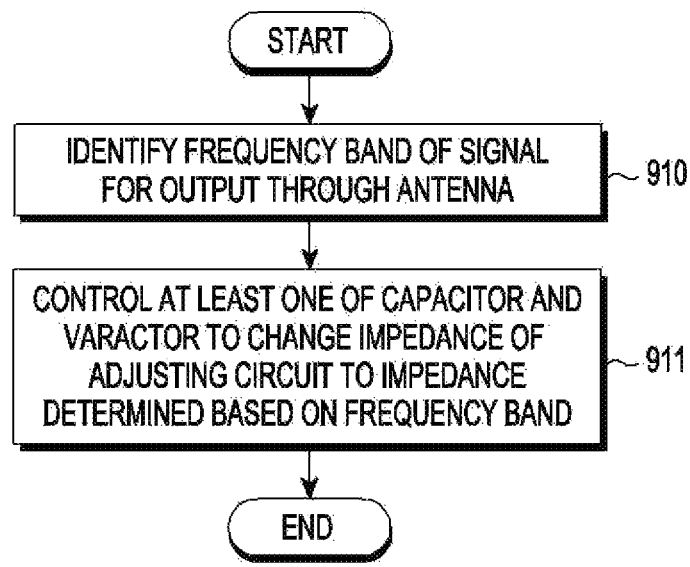
FIG. 9A is a flowchart illustrating a method of varying the impedance of an adjusting circuit depending on frequency bands of signals output through an antenna by an electronic device, according to an embodiment.

FIG. 9A is a flowchart illustrating a method of varying the impedance of an adjusting circuit depending on frequency bands of signals output through an antenna by an electronic device, according to an embodiment.

In step 910, a processor 120, 210, or 840 of an electronic device 101 may identify the frequency band of a signal to be output through an antenna 510.

In step 911, the processor may control at least one of a variable capacitor and a varactor included in an adjusting circuit 323, 443, 550, or 810 so that the impedance of the adjusting circuit changes to the impedance of the adjusting circuit determined based on the identified frequency band. For example, to optimize the performance of the antenna, the processor may determine the impedance of the adjusting circuit based on the identified frequency band.

Figure 9B:
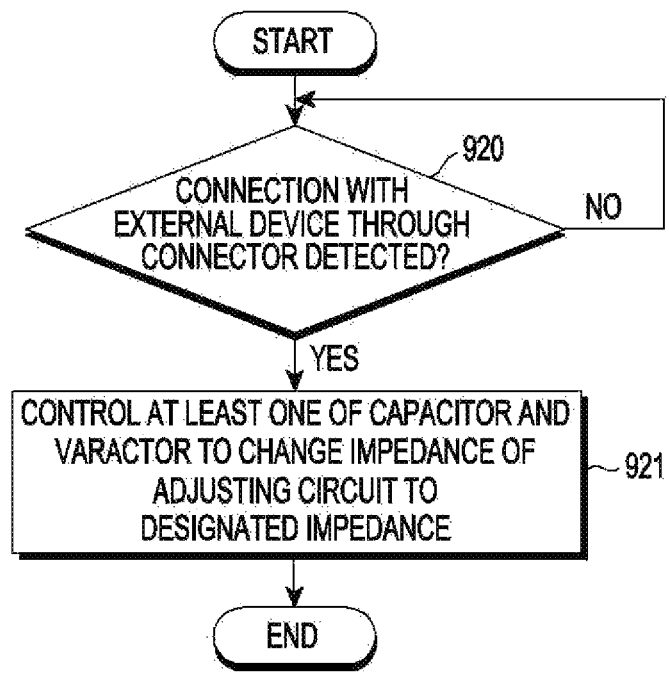
FIG. 9B is a flowchart illustrating a method of varying the impedance of an adjusting circuit depending on a connection to an external device by an electronic device, according to an embodiment.

FIG. 9B is a flowchart illustrating a method of varying the impedance of an adjusting circuit depending on a connection to an external device by an electronic device, according to an embodiment.

In step 920, a processor may identify whether a connection with an external device via a connector disposed adjacent the antenna is detected. When connected with an external device via the connector, the impedance of the antenna may be varied due to the connection with the external device.

In step 921, upon sensing the connection with the external device via the connector, the processor may control at least one of the variable capacitor and the varactor so that the impedance of the adjusting circuit changes to a designated impedance. The degree of the impedance variation in the antenna due to the connection with the external device may be within a designated range. Accordingly, in order to change the varied antenna impedance to the antenna impedance before the connection with the external device, the processor may designate the impedance of the adjusting circuit, and upon detecting the connection with the external device, the processor may vary the impedance of the adjusting circuit to the designated impedance.

In another example, upon sensing a connection with an external device via the connector, the processor may control at least one of the variable capacitor and the varactor based on a signal output through the antenna and the reflection signal of the signal output through the antenna radiated from the antenna. The processor 840 may identify the reflection coefficient of the antenna using the signal output through the antenna and the reflection signal. The processor 840 may control at least one of the variable capacitor and the varactor based on the identified reflection coefficient.

Figure 9C:
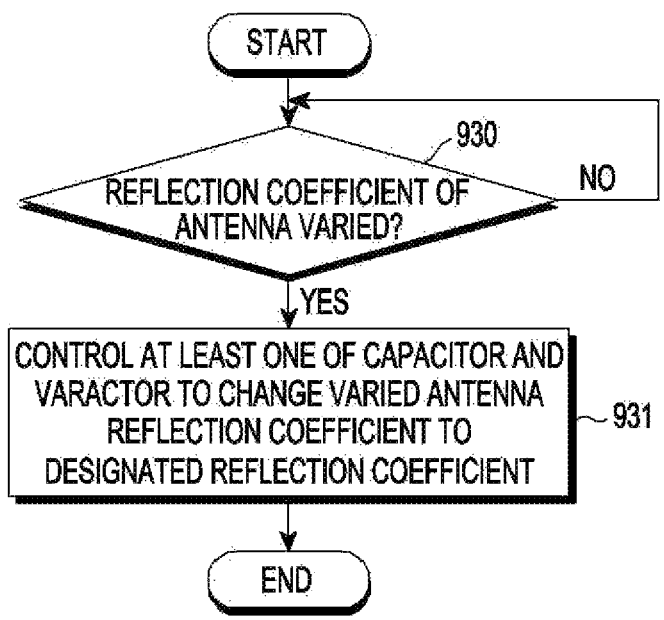
FIG. 9C is a flowchart illustrating a method of varying the impedance of an adjusting circuit by identifying a variation in a reflection coefficient of an antenna by an electronic device, according to an embodiment.

FIG. 9C is a flowchart illustrating a method of varying the impedance of an adjusting circuit by identifying a variation in a reflection coefficient of an antenna by an electronic device, according to an embodiment.

In step 930, the processor may identify whether the reflection coefficient of the antenna varies. For example, the processor may identify whether the reflection coefficient of the antenna varies by identifying the reflection coefficient of the antenna in designated cycles.

In step 931, where the reflection coefficient of the antenna varies, the processor may control at least one of the variable capacitor and the varactor so that the varied antenna reflection coefficient identified changes to a designated reflection coefficient.

According to an embodiment, an electronic device 101 may comprise a first housing 301 forming a portion of an outside surface of the electronic device, a second housing 302 coupled with the first housing and forming another portion of the outside surface of the electronic device, an antenna 510 formed in at least a portion of the second housing, a connector including one or more connection pins for connection with an external device, at least a portion of an outside surface of the connector being formed of a conductive member, an adjusting circuit 323 electrically connected with, at least, the portion of the outside surface of the connector formed of the conductive member wherein an impedance of the adjusting circuit is variable, and a processor configured to vary the impedance of the adjusting circuit based on a signal to be output through the antenna and output the signal through the antenna, with the impedance of the adjusting circuit being varied.

According to an embodiment, the antenna may be shaped to have an opening, and the connector may be disposed to allow a portion of the connector to be exposed to an outside through the opening of the antenna.

According to an embodiment, the electronic device may further comprise a first capacitor (e.g., the first filter circuit 630) connected with at least the portion of the outside surface of the connector formed of the conductive member and the adjusting circuit and a second capacitor (e.g., the second filter circuit 631) connected with at least the portion of the outside surface of the connector formed of the conductive member and a ground of the electronic device.

According to an embodiment, the connector may be one of a USB connector, a charging connector, an interface connector, an earphone connector, and a connector for a storage medium.

According to an embodiment, the adjusting circuit includes a plurality of matching circuits (e.g., 612, 613, and 614 and a switching circuit 611 configured to connect at least one of the plurality of matching circuits with at least the portion of the outside surface formed of the conductive member.

According to an embodiment, the plurality of matching circuits may have different impedances.

According to an embodiment, the processor may be configured to identify a frequency band of the signal to be output through the antenna, select at least one matching circuit among the plurality of matching circuits based on the identified frequency band, and control the switching circuit to connect the at least one selected matching circuit with at least the portion of the outside surface of the connector formed of the conductive member.

According to an embodiment, the processor may be configured to obtain a reflection signal of a signal output through the antenna, select at least one among the plurality of matching circuits based on the signal output through the antenna and the reflection signal, and control the switching circuit to connect the at least one selected matching circuit with at least the portion of the outside surface of the connector formed of the conductive member.

According to an embodiment, the processor may be configured to identify a reflection coefficient of the antenna based on the signal output through the antenna and the reflection signal and select the at least one matching circuit among the plurality of matching circuits so that the identified reflection coefficient changes to a designated reflection coefficient.

According to an embodiment, the adjusting circuit may include at least one of a variable capacitor and a varactor.

According to an embodiment, the processor may be configured to identify a frequency band of the signal to be output through the antenna and control at least one of the variable capacitor and the varactor so that the impedance of the adjusting circuit changes to an impedance determined based on the identified frequency band.

According to an embodiment, the processor may be configured to obtain a reflection signal of a signal output through the antenna, identify a reflection coefficient of the antenna based on the signal output through the antenna and the reflection signal and control at least one of the variable capacitor and the varactor so that the reflection coefficient of the antenna changes to a designated reflection coefficient.

According to an embodiment, an electronic device 101 may comprise an antenna 510, a communication circuit (e.g., the communication interface 170 or communication module 220) connected with the antenna and configured to output signals of a first frequency band and a second frequency band through the antenna, a conductive member 530 disposed adjacent the antenna, a connector received in the conductive member and including one or more connection pins for connection with an external device, a first filter circuit 630 connected with the conductive member and configured to transmit the signals of the first frequency band and the second frequency band, a first matching circuit 612 corresponding to the first frequency band, a second matching circuit 613 corresponding to the second frequency band, and a switching circuit 610 configured to connect the first filter circuit with at least one of the first matching circuit or the second matching circuit.

According to an embodiment, the electronic device may further comprise a second filter circuit 631 connected with the conductive member and a ground of the electronic device and configured to transmit the signals of the first frequency band and the second frequency band.

According to an embodiment, the electronic device may further comprise a processor configured to, when the communication circuit outputs the signal of the first frequency band, connect the first filter circuit with the first matching circuit through the switching circuit, and when the communication circuit outputs the signal of the second frequency band, connect the first filter circuit with the second matching circuit through the switching circuit.

According to an embodiment, the communication circuit may be further configured to output a signal of a third frequency band using the antenna, and the processor may be further configured to, when the communication circuit outputs the signal of the third frequency band, connect the first filter circuit with the first matching circuit and the second matching circuit through the switching circuit.

According to an embodiment, the first matching circuit may be connected with a first area of the ground of the electronic device, and the second matching circuit may be connected with a second area of the ground.

According to an embodiment, an electronic device 101 may comprise a first housing 301 forming a portion of an outside surface of the electronic device, a second housing 302 coupled with the first housing and forming another portion of the outside surface of the electronic device, an antenna 510 formed in at least a portion of the second housing, a connector including one or more connection pins for connection with an external device, at least a portion of an outside surface of the connector being formed of a conductive member, an adjusting circuit 323 electrically connected with, at least, the portion of the outside surface of the connector formed of the conductive member wherein an impedance of the adjusting circuit is variable, and a processor configured to, upon detecting a connection with the external device through the connector, vary the impedance of the adjusting circuit, and output the signal through the antenna, with the impedance of the adjusting circuit being varied.

According to an embodiment, the adjusting circuit may include a plurality of matching circuits 612, 613, and 614 and a switching circuit 611 configured to connect the connector with at least one of the plurality of matching circuits, and the processor may be configured to, upon detecting the connection with the external device through the connector, control the switching circuit to connect at least one designated matching circuit from among the plurality of matching circuits with at least the portion of the outside surface of the connector formed of the conductive member.

According to an embodiment, the adjusting circuit may include at least one of a variable capacitor and a varactor, and the processor may be configured to, upon detecting the connection with the external device through the connector, control at least one of the variable capacitor and the varactor so that the impedance of the adjusting circuit changes to a designated impedance.

Each of the aforementioned components of the electronic device may include one or more parts, and a name of a part may vary with a type of the electronic device. The electronic device in accordance with various embodiments of the present disclosure may include at least one of the aforementioned components, omit some components, or include other additional component(s). Some of the components may be combined into an entity, and the entity may perform the same functions as the components.

As used herein, the term "module" may include a unit implemented in hardware, software, or firmware and may interchangeably be used with other terms, such as "logic," "logic block," "part," or "circuitry." The module may be a single integral component, or a minimum unit or part thereof, adapted to perform one or more functions. According to an embodiment, the module may be implemented in the form of an application-specific integrated circuit (ASIC).

According to an embodiment, at least a part of the device (e.g., modules or their functions) or method (e.g., operations) may be implemented as instructions stored in a computer-readable storage medium (e.g., the memory 130) in the form of a program module. A processor may load a command or data received from another component (i.e., the instructions from the memory 130) and carry out a corresponding function.

The computer-readable medium may include a hard disk, a floppy disk, a magnetic medium (e.g., magnetic tape), an optical recording medium, a compact disc-read only memory (CD-ROM), a digital versatile disc (DVD), a magnetic-optical medium (e.g., a floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components may be carried out sequentially, in parallel, repeatedly or heuristically, or at least some operations may be executed in a different order, omitted, or other operations may be added.

According to an embodiment, a non-transitory computer readable recording medium recording a program executed on a computer and including executable instructions that are executed by a processor may be provided to enable the processor to vary an impedance of an adjusting circuit included in an electronic device based on a signal to be output through an antenna of the electronic device and to output the signal through the antenna, with the impedance of the adjusting circuit being varied.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device, comprising:
   a first housing forming a portion of an outside surface of the electronic device;
   a second housing coupled with the first housing and forming another portion of the outside surface of the electronic device;
   an antenna formed in at least a portion of the second housing and connected with a feeding circuit for wireless communication;
   a universal serial bus (USB) connector including one or more connection pins for connection with an external device, at least a portion of an outside surface of the USB connector being formed of a conductive member;
   an adjusting circuit electrically connected to the portion of the outside surface of the USB connector formed of the conductive member via a first capacitor and connected directly to at least one ground of the electronic device; and
   a processor configured to:
      control an impedance of the adjusting circuit based on a signal to be output through the antenna, and
      output the signal through the antenna, with the impedance of the adjusting circuit being controlled.

2. The electronic device of claim 1, wherein the antenna has a portion configured in an open shape, and wherein the USB connector is arranged such that a portion of the USB connector is exposed to an outside through the portion of the antenna configured in the open shape.

3. The electronic device of claim 1, further comprising:
   a second capacitor connected with at least the portion of the outside surface of the USB connector formed of the conductive member and a first ground of the electronic device.

4. The electronic device of claim 1, further comprising:
   at least one of a charging connector, an interface connector, an earphone connector, or a connector for a storage medium.

5. The electronic device of claim 1, wherein the adjusting circuit includes a plurality of matching circuits and a switching circuit, and
   wherein the switching circuit is configured to connect at least one of the plurality of matching circuits with the portion of the outside surface formed of the conductive member.

6. The electronic device of claim 5, wherein the plurality of matching circuits have different impedances.

7. The electronic device of claim 5, wherein the processor is further configured to:
   identify a frequency band of the signal to be output through the antenna,
   select at least one matching circuit from among the plurality of matching circuits based on the identified frequency band, and
   control the switching circuit to connect the selected at least one matching circuit with the portion of the outside surface of the USB connector formed of the conductive member.

8. The electronic device of claim 5, wherein the processor is further configured to:
   obtain, through the antenna, a reflection signal of the output signal,
   select at least one matching circuit from among the plurality of matching circuits based on the output signal and the reflection signal, and
   control the switching circuit to connect the selected at least one matching circuit with the portion of the outside surface of the USB connector formed of the conductive member.

9. The electronic device of claim 8, wherein the processor is further configured to:
   identify a reflection coefficient of the antenna based on the output signal and the reflection signal, and
   select the at least one matching circuit from among the plurality of matching circuits such that the identified reflection coefficient changes to a designated reflection coefficient.

10. The electronic device of claim 1, wherein the adjusting circuit includes at least one of a variable capacitor and a varactor.

11. The electronic device of claim 10, wherein the processor is further configured to identify a frequency band of the signal to be output through the antenna and control at least one of the variable capacitor or the varactor so that the impedance of the adjusting circuit changes to an impedance corresponding to the identified frequency band.

12. The electronic device of claim 10, wherein the processor is further configured to:

obtain, through the antenna, a reflection signal of the output signal,
identify a reflection coefficient of the antenna based on the output signal and the reflection signal, and
control at least one of the variable capacitor or the varactor such that the reflection coefficient of the antenna changes to a designated reflection coefficient.

13. An electronic device, comprising:
an antenna connected with a feeding circuit for wireless communication;
a communication circuit connected with the antenna and configured to output signals of a first frequency band and a second frequency band through the antenna;
a conductive member disposed adjacent the antenna;
a universal serial bus (USB) connector including one or more connection pins for connection with an external device received in the conductive member;
a first filter circuit connected with the conductive member and capable of passing the signals of the first frequency band and the second frequency band;
a first matching circuit corresponding to the first frequency band and connected directly to at least one ground;
a second matching circuit corresponding to the second frequency band and connected directly to the at least one ground;
a switching circuit configured to connect the conductive member, via the first filter circuit with at least one of the first matching circuit or the second matching circuit; and
a processor configured to:
control the switching circuit to connect the conductive member, via the first filter circuit, with at least one of the first matching circuit or the second matching circuit based on a signal to be output through the antenna, and
output the signal through the antenna, with the conductive member being connected with the at least one of the first matching circuit or the second matching circuit.

14. The electronic device of claim 13, further comprising a second filter circuit connected to the conductive member and a first ground of the electronic device and capable of passing the signals of the first frequency band and the second frequency band.

15. The electronic device of claim 13, wherein the processor is further configured to:
when the communication circuit outputs a signal of the first frequency band, connect the first filter circuit to the first matching circuit through the switching circuit, and
when the communication circuit outputs a signal of the second frequency band, connect the first filter circuit to the second matching circuit through the switching circuit.

16. The electronic device of claim 15, wherein the communication circuit is further configured to output a signal of a third frequency band using the antenna, and wherein the processor is further configured to, when the communication circuit outputs the signal of the third frequency band, connect the first filter circuit to the first matching circuit and the second matching circuit through the switching circuit.

17. The electronic device of claim 13, wherein the first matching circuit is connected to a first area of a second ground of the at least one ground, and the second matching circuit is connected to a second area of the second ground.

18. An electronic device, comprising:
a first housing forming a portion of an outside surface of the electronic device;
a second housing coupled with the first housing and forming another portion of the outside surface of the electronic device;
an antenna formed in at least a portion of the second housing and connected with a feeding circuit for wireless communication;
a universal serial bus (USB) connector including one or more connection pins for connection with an external device, at least a portion of an outside surface of the USB connector being formed of a conductive member;
an adjusting circuit electrically connected to a portion of an outside surface of the USB connector formed of a conductive member via a first capacitor and connected directly to at least one ground of the electronic device; and
a processor configured to:
based on detecting a connection with the external device through the USB connector, control an impedance of the adjusting circuit based on a signal to be output through the antenna, and
output the signal through the antenna, with the impedance of the adjusting circuit being controlled.

19. The electronic device of claim 18, wherein the adjusting circuit includes a plurality of matching circuits and a switching circuit configured to connect the USB connector with at least one of the plurality of matching circuits, and
wherein the processor is further configured to, based on detecting the connection with the external device through the USB connector, control the switching circuit to connect at least one designated matching circuit from among the plurality of matching circuits with the portion of the outside surface of the USB connector formed of the conductive member.

20. The electronic device of claim 18, wherein the adjusting circuit includes at least one of a variable capacitor and a varactor, and
wherein the processor is further configured to, based on detecting the connection with the external device through the USB connector, control at least one of the variable capacitor or the varactor such that the impedance of the adjusting circuit changes to a designated impedance.

* * * * *